(12) United States Patent
Galitsky

(10) Patent No.: US 11,741,316 B2
(45) Date of Patent: *Aug. 29, 2023

(54) EMPLOYING ABSTRACT MEANING REPRESENTATION TO LAY THE LAST MILE TOWARDS READING COMPREHENSION

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,300

(22) Filed: Aug. 30, 2022

(65) Prior Publication Data

US 2022/0414342 A1   Dec. 29, 2022

Related U.S. Application Data

(63) Continuation of application No. 17/099,300, filed on Nov. 16, 2020, now Pat. No. 11,501,085.

(60) Provisional application No. 63/030,566, filed on May 27, 2020, provisional application No. 62/937,942, filed on Nov. 20, 2019.

(51) Int. Cl.
| | | |
|---|---|---|
| *G06F 40/44* | (2020.01) | |
| *G06F 40/35* | (2020.01) | |
| *G06F 40/289* | (2020.01) | |
| *G06F 16/9032* | (2019.01) | |
| *G06F 18/214* | (2023.01) | |

(52) U.S. Cl.
CPC ........ *G06F 40/44* (2020.01); *G06F 16/90332* (2019.01); *G06F 18/214* (2023.01); *G06F 40/289* (2020.01); *G06F 40/35* (2020.01)

(58) Field of Classification Search
CPC .. G06F 40/44; G06F 16/90332; G06F 40/385; G06F 40/289; G06F 18/214
See application file for complete search history.

(56) References Cited

U.S. PATENT DOCUMENTS 6,961,692 B1   11/2005   Polanyi et al.
7,013,259 B1   3/2006   Polanyi et al.
(Continued)

OTHER PUBLICATIONS

U.S. Appl. No. 17/099,300, Notice of Allowance dated Jul. 29, 2022, 10 pages.
(Continued)

*Primary Examiner* — Sonia L Gay
(74) *Attorney, Agent, or Firm* — Kilpatrick Townsend & Stockton LLP

(57) ABSTRACT

An autonomous agent creates a first semantic tree from a question and second semantic tree from a candidate answer. The agent identifies, between the first semantic tree and the second semantic tree, common subtrees and calculates a semantic alignment score from a sum of sizes of each of the common subtrees. The agent forms a first syntactic tree for the question and a second syntactic tree for the candidate answer. The agent identifies a number of common syntactic nodes between the first syntactic tree and the second syntactic tree. The agent calculates a syntactic alignment score based on the number of common syntactic nodes. Responsive to determining that a sum of the semantic alignment score and the syntactic alignment score is greater than a threshold, the agent outputs the candidate answer to a device.

20 Claims, 11 Drawing Sheets

(56) References Cited

U.S. PATENT DOCUMENTS

| | | |
|---|---|---|
| 11,501,085 B2 | 11/2022 | Galitsky |
| 2002/0046018 A1 | 4/2002 | Marcu et al. |
| 2003/0138758 A1 | 7/2003 | Burstein et al. |
| 2004/0044519 A1 | 3/2004 | Polanyi et al. |
| 2004/0158452 A1 | 8/2004 | Polanyi et al. |
| 2004/0158453 A1 | 8/2004 | Polanyi et al. |
| 2007/0143098 A1 | 6/2007 | van den Berg et al. |
| 2015/0081277 A1 | 3/2015 | Behi |
| 2017/0358295 A1 | 12/2017 | Roux et al. |
| 2018/0052818 A1 | 2/2018 | Bethard et al. |
| 2018/0329880 A1 | 11/2018 | Galitsky |
| 2018/0357221 A1 | 12/2018 | Galitsky |
| 2018/0365228 A1 | 12/2018 | Galitsky |
| 2019/0005027 A1 | 1/2019 | He et al. |
| 2019/0095420 A1 | 3/2019 | Galitsky |
| 2019/0371299 A1 | 12/2019 | Jiang et al. |
| 2021/0150152 A1 | 5/2021 | Galitsky |

OTHER PUBLICATIONS

Hasan, Complex Question Answering: Minimizing the Gaps and Beyond, Thesis Submitted to the School of Graduate Studies of the University of Lethbridge, 2013, 202 pages.

Lamjiri et al., Comparing the Contribution of Syntactic and Semantic Features in Closed versus Open Domain Question Answering, IEEE, Semantic Computing, Oct. 2007, 7 pages.

U.S. Appl. No. 16/408,224, Notice of Allowance dated Jan. 7, 2022, 9 pages.

U.S. Appl. No. 16/408,224, Supplemental Notice of Allowance dated Feb. 15, 2022, 6 pages.

U.S. Appl. No. 16/995,302, Notice of Allowance dated Jan. 7, 2022, 11 pages.

U.S. Appl. No. 16/902,015, First Action Interview Pilot Program Pre-Interview Communication dated Jan. 21, 2022, 5 pages.

U.S. Appl. No. 16/902,015, First Action Interview Office Action Summary dated Mar. 11, 2022, 5 pages.

Galitsky et al., On a Chat Bot Finding Answers with Optimal Rhetoric Representation, Proceedings of Recent Advances in Natural Language Processing, Sep. 2017, p. 253-359, 2017.

Verberne et al., Discourse-based answering of why questions, TAL vol. 47, 21-41, 2007.

Sadek et al., A Discourse-Based Approach for Arabic Question Answering, ACM Trans. Asian Low-Resour. Lang. Inf. Process., vol. 16, No. 2, Article 11, Nov. 2016, whole document, 2016.

Sadek et al., Arabic Rhetorical Relations Extraction for Answering Why and How to Questions, G. Bouma et al. (Eds ): NLDB 2012, LNCS 7337, pp. 385-390, 2012.

Galitsky, et al., "Rhetoric map of an answer to compound queries." Proceedings of the 53rd Annual Meeting of the Association for Computational Linguistics and the 7th International Joint Conference on Natural Language Processing (vol. 2: Short Papers). 2015. (Year: 2015).

Galitsky, et al., "Matching sets of parse trees for answering multi-sentence questions." In Proceedings of the International Conference Recent Advances in Natural Language Processing RANLP 2013, pp. 285-293, Hissar, Bulgaria. INCOMA Ltd. Shoumen, Bulgaria.

Galitsky, "Discovering Rhetorical Agreement between a Request and Response", Dialogue and Discourse, Dec. 2017, pp. 167-205 (Year: 2017).

Galitsky, "Chatbot with a Discourse Structure-Driven Dialogue Management", publisher: Association for Computational Linguistics, published: Apr. 2017, pp. 87-90 (Year: 2017).

"Vietnamese Police Detain 8 Suspects in Connection with Illegal Immigration Organizing", People.cn, Available Online at: http://en.people.cn/n3/2019/1104/c90000-9629296.html, Nov. 4, 2019, 1 page.

Auer et al., "DBpedia: A Nucleus for a Web of Open Data", International Semantic Web Conference, Lecture Notes in Computer Science, vol. 4825, 2007, pp. 1-14.

Banarescu et al., "Abstract Meaning Representation for Sembanking", In Proceedings of the 7th Linguistic Annotation Workshop and Interoperability with Discourse., 2013, 9 pages.

Bao et al., "Knowledge-based Question Answering as Machine Translation", Association for Computational Linguistics, 2014, pp. 967-976.

Bollacker et al., "Freebase: A Collaboratively Created Graph Database for Structuring Human Knowledge", Proceedings of the 2008 ACM SIGMOD international conference on Management of data, Jun. 2008, pp. 1247-1250.

Bordes et al., "Question Answering With Subgraph Embeddings", In Proceedings of the 2014 Conference on Empirical Methods in Natural Language Processing EMNLP, Oct. 2014, pp. 615-620.

Choi et al., "QuAC: Question Answering in Context", Empirical Methods in Natural Language Processing., 2018, pp. 2174-2184.

Damonte, "An Incremental Parser for Abstract Meaning Representation", Proceedings of EACL, 2017, 12 pages.

Damonte et al., "Cross-lingual Abstract Meaning Representation Parsing", Proceedings of NAACL., 2018, 10 pages.

Devlin et al., "BERT: Pre-Training of Deep Bidirectional Transformers for Language Understanding", In Proceedings of the 2019 Conference of the North American Chapter of the Association for Computational Linguistics: Human Language Technologies, vol. 1, May 24, 2019, pp. 4171-4186.

Dwivedi, "NLP—Building a Question Answering Model", Towards Data Science, Available Online at: https://towardsdatascience.com/nlp-building-a-question-answering-model-ed0529a68c54, Mar. 29, 2018, 7 pages.

Flanigan et al., "A Discriminative Graph-based Parser for the Abstract Meaning Representation", Proceedings of the 52nd Annual Meeting of the Association for Computational Linguistics, Jun. 2014, pp. 1426-1436.

Galitsky, "Assuring Chatbot Relevance at Syntactic Level", Developing Enterprise Chatbots, 2019, 42 pages.

Galitsky, "Building Chatbot Thesaurus", Developing Enterprise Chatbots, 2019, 32 pages.

Galitsky et al., "Improving Text Retrieval Efficiency With Pattern Structures on Parse Thickets", In: Proceedings of FCAIR, 2013, pp. 6-21.

Galitsky et al., "Inferring Semantic Properties of Sentences Mining Syntactic Parse Trees", Data Knowl Eng, vol. 81, 2012, pp. 21-45.

Galitsky, "Machine Learning of Syntactic Parse Trees for Search and Classification of Text", Eng Appl AI, vol. 26, No. 3, 2012, pp. 1072-1091.

Galitsky et al., "Using Generalization of Syntactic Parse Trees for Taxonomy Capture on the Web", ICCS, 2011, pp. 104-117.

Kocisky et al., "The NarrativeQA Reading Comprehension Challenge", Transactions of the Association for Computational Linguistics, vol. 6, May 2018, pp. 317-328.

Kuchaiev et al., "Topological Network Alignment Uncovers Biological Function and Phylogeny", Journal of the Royal Society Interface, vol. 7, Mar. 24, 2010, pp. 1341-1354.

Kwiatkowski et al., "Scaling Semantic Parsers With on-the-fly Ontology Matching", Empirical Methods in Natural Language Processing, 2013, pp. 1545-1556.

Lan et al., "ALBERT: A Lite BERT for Self-Supervised Learning of Language Representations", In Conference Paper at ICLR 2020, Feb. 9, 2020, pp. 1-17.

Li et al., "Annotating the Little Prince with Chinese AMRs", LAW-2016, Berlin, Germany, 2016, 9 pages.

Liang, "Lambda Dependency-based Compositional Semantics", Technical report, arXiv., Sep. 19, 2013, 7 pages.

Liu et al., "Roberta: A Robustly Optimized Bert Pretraining Approach", arXiv:1907.11692, Available Online at: https://arxiv.org/abs/1907.11692, 2019, 13 pages.

May et al., "SemEval-2017 Task 9: Abstract Meaning Representation Parsing and Generation", Proceedings of the 11th International Workshop on Semantic Evaluation, 2017, pp. 536-545.

Milenkovic et al., "Uncovering Biological Network Function via Graphlet Degree Signatures", Cancer Informatics, vol. 6, 2008, pp. 257-273.

Narasimhan, "Nvidia Clocks Worlds Fastest Bert Training Time and Largest Transformer Based Model, Paving Path for Advanced

(56) References Cited

OTHER PUBLICATIONS

Conversational AI", nVIDIA Developer Blog, Available Online at: https://developer.nvidia.com/blog/training-bert-with-gpus/, Aug. 13, 2019, 5 pages.

Peters et al., "Deep Contextualized Word Representations", Proceedings of the 2018 Conference of the North American Chapter of the Association for Computational Linguistics: Human Language Technologies, vol. 1, Jun. 2018, pp. 2227-2237.

Rajpurkar et al., "Know What You Don't Know: Unanswerable Questions for SQuAD", Proceedings of the 56th Annual Meeting of the Association for Computational Linguistics (vol. 2: Short Papers), Jul. 2018, 6 pages.

Suchanek et al., "A Core of Semantic Knowledge", In Proceedings of the 16th international conference on World Wide Web, May 8-12, 2007, pp. 697-706.

Xue, "Chinese Abstract Meaning Representation", Available Online at: https://www.cs.brandeis.edu/~clp/camr/camr.html., 2019, 42 pages.

Yao, "Information Extraction over Structured data: Question Answering with Freebase", In Proceedings of the 52nd ACL, 2014, pp. 956-966.

Yih et al., "Semantic Parsing via Staged Query Graph Generation: Question Answering with Knowledge Base", Microsoft Research, Proceedings of the 53rd Annual Meeting of the Association for Computational Linguistics and the 7th International Joint Conference on Natural Language Processing, vol. 1, Jul. 26-31, 2015, pp. 1321-1331.

Question 202

What is the process of constructing a building or infrastructure?
Ground Truth Answers:
Construction Construction Construction
Prediction: Construction Question 204

What typically involves mass production of similar items without a designated purchaser?
Ground Truth Answers:
Manufacturing Manufacturing Manufacturing
Prediction: Manufacturing Question-Answer Dataset 210

Construction is the process of constructing a building or infrastructure. Construction differs from manufacturing in that manufacturing typically involves mass production of similar items without a designated purchaser, while construction typically takes place on location for a known client. Construction as an industry comprises six to nine percent of the gross domestic product of developed countries. Construction starts with planning [citation needed] design, and financing and continues until the project is built and ready for use.

```
(v13 / tell-01
    :ARG0 (v11 / person
        :name (v12 / name
            :op1 "Nguyen"
            :op2 "Huu"
            :op3 "Cau")
        :wiki "Nguyen_Huu_Cau")
    :ARG2 (v15 / media
        :ARG1-of (v14 / local-02))
    :ARG1 (v16 / sideline
        :mod (v17 / meet-03
            :time "biannual"
            :ARG0 (v20 / legislate-01
                :mod (v19 / top)
                :ARG0 (v18 / country))))
    :ARG0 (v3 / person
        :quant 21
        :time (v2 / morning
            :mod (v1 / monday))
        :ARG2-of (v4 / suspect-01
            :ARG1 (v5 / miss-01
                :location (v6 / country
                    :name (v7 / name
                        :op1 "Britain")
                    :wiki "United_Kingdom")))
        :ARG0-of (v8 / head-01
            :ARG1 (v10 / police
                :name (v9 / name
                    :op1 "Nghe"
                    :op2 "An")))))
```

*FIG. 4*

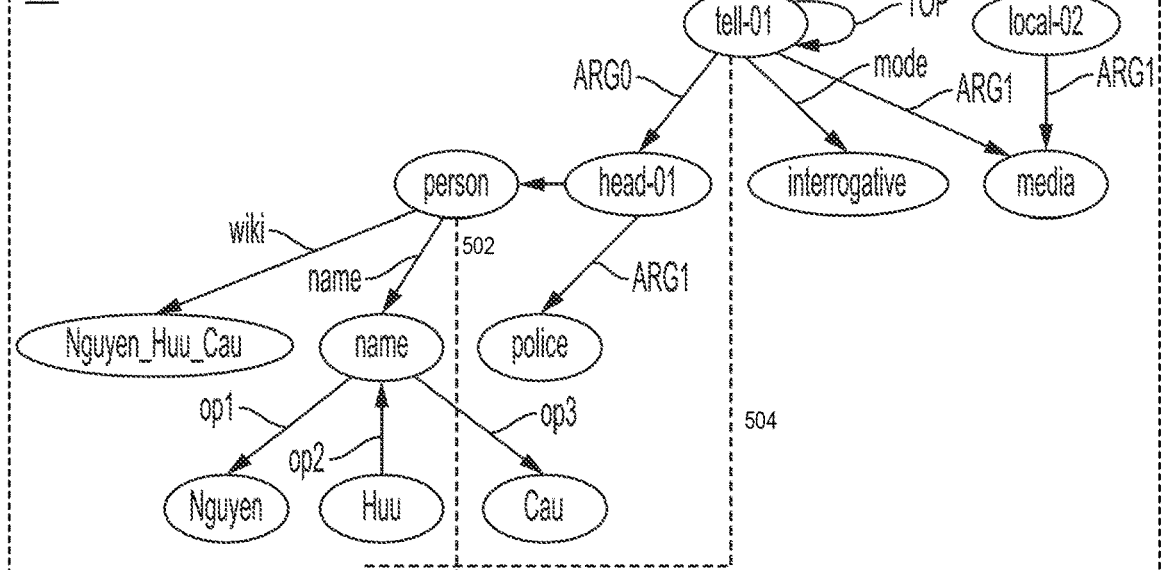
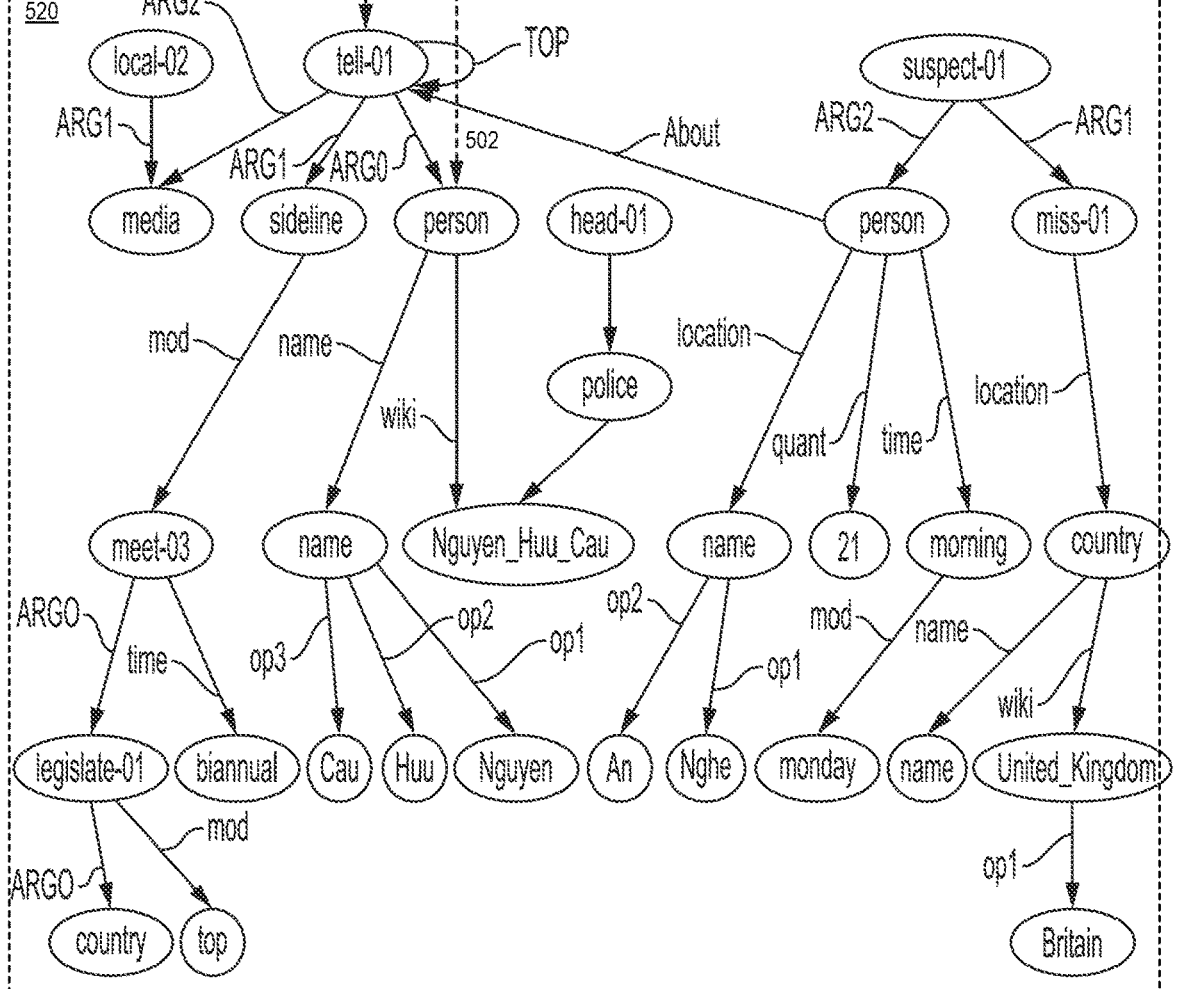
FIG. 5

EMPLOYING ABSTRACT MEANING REPRESENTATION TO LAY THE LAST MILE TOWARDS READING COMPREHENSION

CROSS-REFERENCES TO RELATED APPLICATIONS

This application is a continuation of U.S. application Ser. No. 17/099,300, filed Nov. 16, 2020, which claims the benefit of U.S. Provisional Application No. 62/937,942 filed Nov. 20, 2019, now U.S. Pat. No. 11,501,085, and U.S. Provisional Application No. 63/030,566 filed May 27, 2020, the contents of all of which are incorporated herein for all purposes.

TECHNICAL FIELD

This disclosure is generally concerned with linguistics. More specifically, this disclosure relates to using semantic and syntactic relationships to generate or validate answers to questions.

BACKGROUND

Computer-implemented applications of linguistics are increasing due to the greatly increased speed of processors and capacity of memory. For example, computer-based analysis of language discourse facilitates numerous applications, such as automated agents that can answer questions received from user devices. But existing techniques are not able to reliably and accurately answer questions. Accordingly, improved autonomous agents are desired.

BRIEF SUMMARY

Techniques are disclosed for Machine reading comprehension (MRC), such as semantic analysis, syntactic analysis, and universal graph alignment. In particular, disclosed techniques involve generating and/or verifying answers to questions represented by using syntactic, semantic and entity-based graph representation of text.

In an aspect, a method involves creating a first semantic tree from a question and second semantic tree from a candidate answer. Each semantic tree includes nodes and edges. The nodes represent entities. Each edge represents a relationship between two of the entities. The method involves identifying, between the first semantic tree and the second semantic tree, a plurality of common subtrees. A common subtree includes nodes and edges. Each node represents a common entity that is common between the first semantic tree and the second semantic tree. Each edge between the nodes represents a semantic relationship between the entities. The method further involves calculating a semantic alignment score from a sum of sizes of each of the plurality of common subtrees. A size of a common subtree equals a number of nodes in the common subtree. The method further involves forming a first syntactic tree for the question and a second syntactic tree for the candidate answer. Each syntactic tree includes syntactic nodes that represent a word and an associated part of speech. The method further involves identifying, between the first syntactic tree and the second syntactic tree, a number of common syntactic nodes. The method further involves calculating a syntactic alignment score based on the number of common syntactic nodes. The method further involves, responsive to determining that a sum of the semantic alignment score and the syntactic alignment score is greater than a threshold, outputting the candidate answer to a device.

In an aspect, the identifying includes applying a trained classification model to the first syntactic tree and the second syntactic tree; and obtaining the common syntactic nodes from the classification model.

In an aspect, the method involves creating a third semantic tree from an additional candidate answer. The method further involves identifying an additional plurality of common subtrees between the question and the additional candidate answer. The method further involves calculating an additional semantic alignment score that is based on a sum of sizes of each of the additional plurality of common subtrees. The method further involves forming a third syntactic tree for the candidate answer. The method further involves identifying, between the first syntactic tree and the third syntactic tree, an additional number of common syntactic nodes. The method further involves calculating an additional syntactic alignment score based on the additional number of common syntactic nodes. The method further involves, responsive to determining that an additional sum of the additional semantic alignment score and the additional syntactic alignment score is greater than a threshold, outputting the additional candidate answer to the device.

In an aspect, the method further involves providing the question into a classification model, wherein the classification model is trained to select a body of text corresponding to the question; and obtaining, from the classification model, the candidate answer.

In an aspect, the method further involves training the classification model. The training involves performing operations iteratively. The operations include providing, to the classification model, a training question and text including context corresponding to the training question. The operations include receiving an answer from the classification model. The operations include comparing entities in answer to entities in a reference answer that corresponds to the training question. The operations include adjusting, based on the comparing, a parameter of the classification model to minimize a loss function.

In an aspect, the method further involves translating text into a set of vectors, wherein each vector represents words and sentences from the text, providing the set of vectors to a classification model, and obtaining the candidate answer from the classification model. The classification model can be trained to generate answers from text.

In an aspect, the translating includes providing the question and the candidate answer to a word to vector (word2vec) model.

The exemplary methods discussed above can be implemented on systems including one or more processors or stored as instructions on a non-transitory computer-readable medium.

BRIEF DESCRIPTION OF THE DRAWINGS

FIG. 2 depicts an example of a question and answer, in accordance with an aspect.

FIG. 4 depicts an example of a semantic representation of an answer text, in accordance with an aspect.

FIG. 5 depicts an annotated abstract meaning representation graph for a question and an answer and a mapping between question and answer, in accordance with an aspect.

DETAILED DESCRIPTION

Aspects of the present disclosure relate to machine reading comprehension (MRC) that employs semantic analysis, syntactic analysis, and universal graph alignment to provide improved accuracy. In particular, disclosed techniques involve generating and/or verifying answers to questions represented by using syntactic, semantic and entity-based graph representation of text. These techniques can be used to correct answers generated by deep learning systems. An example of semantic analysis is Abstract Meaning Representation (AMR).

Incorporating knowledge about the target paragraph from such sources as syntactic parse tree and semantic abstract meaning representation (AMR) parsing result can provide tools for answering attribute-value questions. Traversing syntactic parse trees and semantic parse trees in parallel allows for exhaustive coverage of possible questions.

Machine reading comprehension is a long-standing objective of natural language understanding. MRC aims to teach a machine to answer a question automatically according to a given passage. Answering factoid questions can be difficult. As such, many existing systems are trained with curated questions and answers generated by domain-specific experts (e.g., banking, law, science, etc.). However, such systems are limited in that the factoid must exist in the set of training data used by the model of the system. Given that the training data is often prepared by enterprise users, and given the range of products and services that large enterprises can offer, the sheer number of questions that need to be trained to ensure coverage is immerse. Further, reliance on such data also presents a maintenance challenge because conditions constantly change, and systems need to be updated to handle new products and services.

Existing solutions, such as Deep Learning (DL) systems, suffer deficiencies. For instance, in spite of the great success of DL systems for MRC tasks, a number of simple questions are still answered incorrectly. For instance, when semantic roles are ambiguous, multiple instances of attributes of the same semantic types exist, or there is a complex syntactic construction, a learning-based models may be confused.

Figure 1:
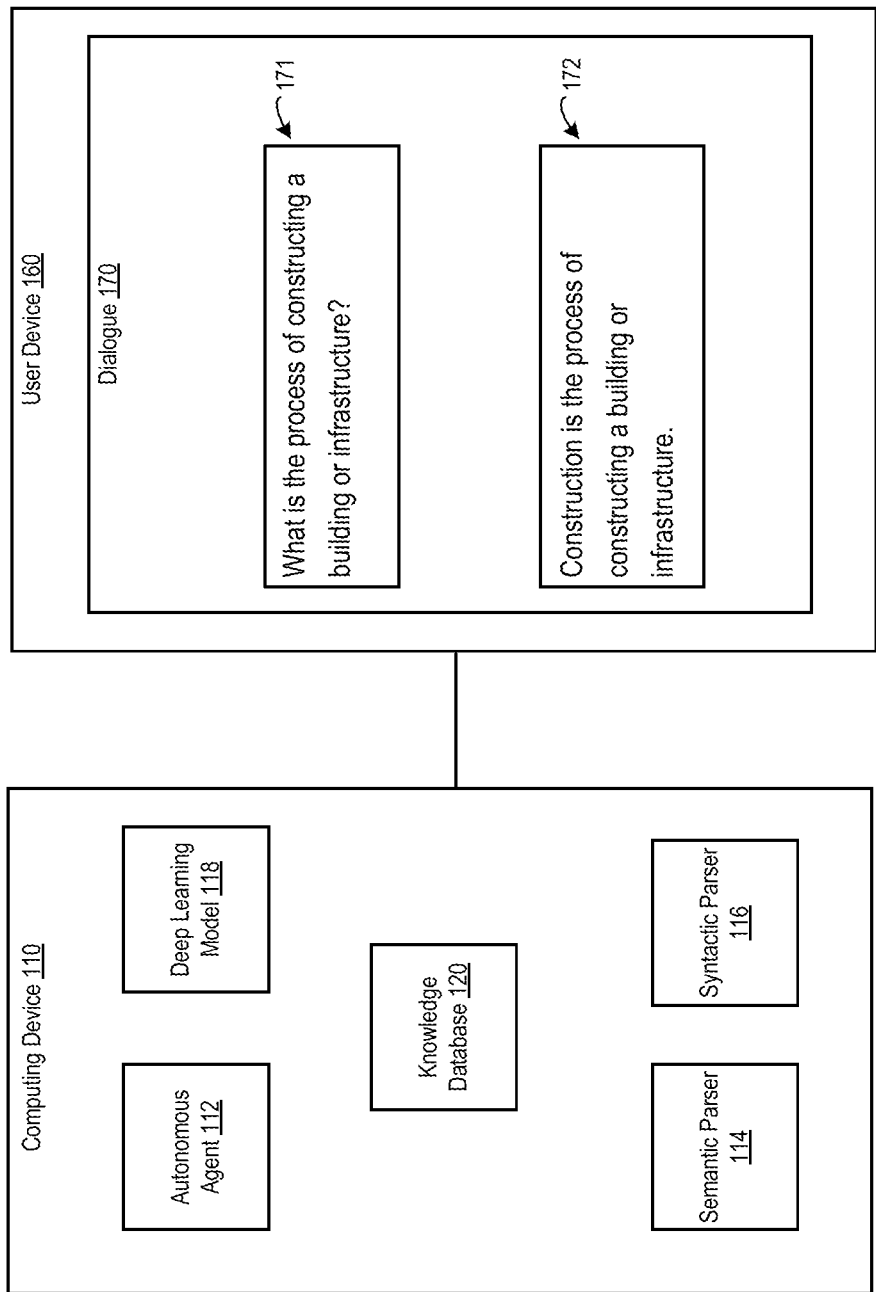
FIG. 1 depicts an example of a computing environment for machine reading comprehension, in accordance with an aspect of the present disclosure.

FIG. 1 depicts an example of a computing environment for machine reading comprehension, in accordance with an aspect of the present disclosure. In the example depicted in FIG. 1, computing environment 100 includes one or more of computing device 110 and user device 160. Computing device 110 implements an autonomous agent 112 that engages in a conversation with user device 160 and uses one or more of the techniques disclosed herein to generate answers to questions provided by user device 160. Examples of computing device 110 are distributed system 900 and client computing devices 902, 904, 906, and 908.

User device 160 can be any mobile device such as a mobile phone, smart phone, tablet, laptop, smart watch, and the like. As depicted, user device 160 includes dialogue 170, which includes utterances 171-172. Examples of user device 160 include client computing devices 902, 904, 906, and 908.

Computing device 110 can include one or more of autonomous agent 112, semantic parser 114, syntactic parser 116, deep learning model 118, and knowledge database 120. Semantic parser 114 can use techniques such as abstract meaning representation (AMR) to generate one or more semantic trees that represent knowledge or information present in a question (e.g., utterance 171) and/or a candidate answer. Syntactic parser 116 generates syntactic parse trees for the question and/or a candidate answer. Semantic and syntactic information is used to validate the candidate answer.

In the example depicted, computing device 110 interacts with user device 160 in a dialogue session. Dialogue 170, depicted on user device 160, includes utterances 171 and 172. Computing device 110 accesses utterance 171, analyzes text of the utterance, and determines an answer from a candidate answer. If the candidate answer is determined to be accurate, then autonomous agent 112 provides the candidate answer to user device 160. The conversation can continue.

Examples of suitable text include electronic text source such as text files, Portable Document Format (PDF)® documents, rich text documents, and the like. In some cases, preprocessing may be performed on the input text to remove unwanted characters or formatting fields. Input text can be organized by using one or more structural or organizational approaches such as sections, paragraphs, pages, and the like.

To assist computing device 110 in comprehending the meaning of a sentence, semantic parsing can be applied to map the natural language sentence to some semantic representation. AMR is one such semantic representation and can involve generating a rooted, directed, acyclic graph with labels on the edges (relations) and leaves (concepts). AMR includes a readable bank of English sentences paired with their whole-sentence, logical meanings, resulting in semantic parsers that are as ubiquitous as syntactic ones. The building blocks for the AMR representation are concepts and relations between them. Understanding these concepts and their relations is crucial to computing the meaning of a sentence.

In some cases, the entities are matched using knowledge database 120. Knowledge database 120 can be a domain-specific ontology (e.g., finance, law, business, science, etc.). The knowledge database 120, among other features, can provide synonym matching. Autonomous agent 112 can build knowledge database 120 or knowledge database 120 from an external source.

Additionally or alternatively, deep learning model 118 can generate candidate answers. Deep learning model 118 can answer a high percentage of arbitrary questions. Autonomous agent 112 can verify the answers generated by deep learning model 118 using a more deterministic technique. For instance, a semantic graph such as AMR can verify the correctness of an answer, involving named entity recognition (NER) tagging and semantic role information. If an answer generated by deep learning model 118 is determined to be incorrect, then autonomous agent 112 can use AMR as complementary deep learning and identify the correct answer within the answer text.

FIG. 2 depicts an example of a question and answer, in accordance with an aspect. FIG. 2 depicts question 202, question 204, and question-answer dataset 210. Question-answer dataset 210 can originate from a public dataset such as the Stanford Question-Answer Dataset (SQuAD). As can be seen, there can be a substantial syntactic similarity between phrasing in a question (e.g., question 202) and in an answer. Once a Wh-word is substituted by a placeholder of a certain semantic type (such as noun-entity), a syntactic similarity between question and answer can be established. Within question-answer dataset 210, semantic similarity is shown highlighted in boxes. Examples of Wh-words include what, where, whom, when, as well as other question words such as how and if.

Figure 3:
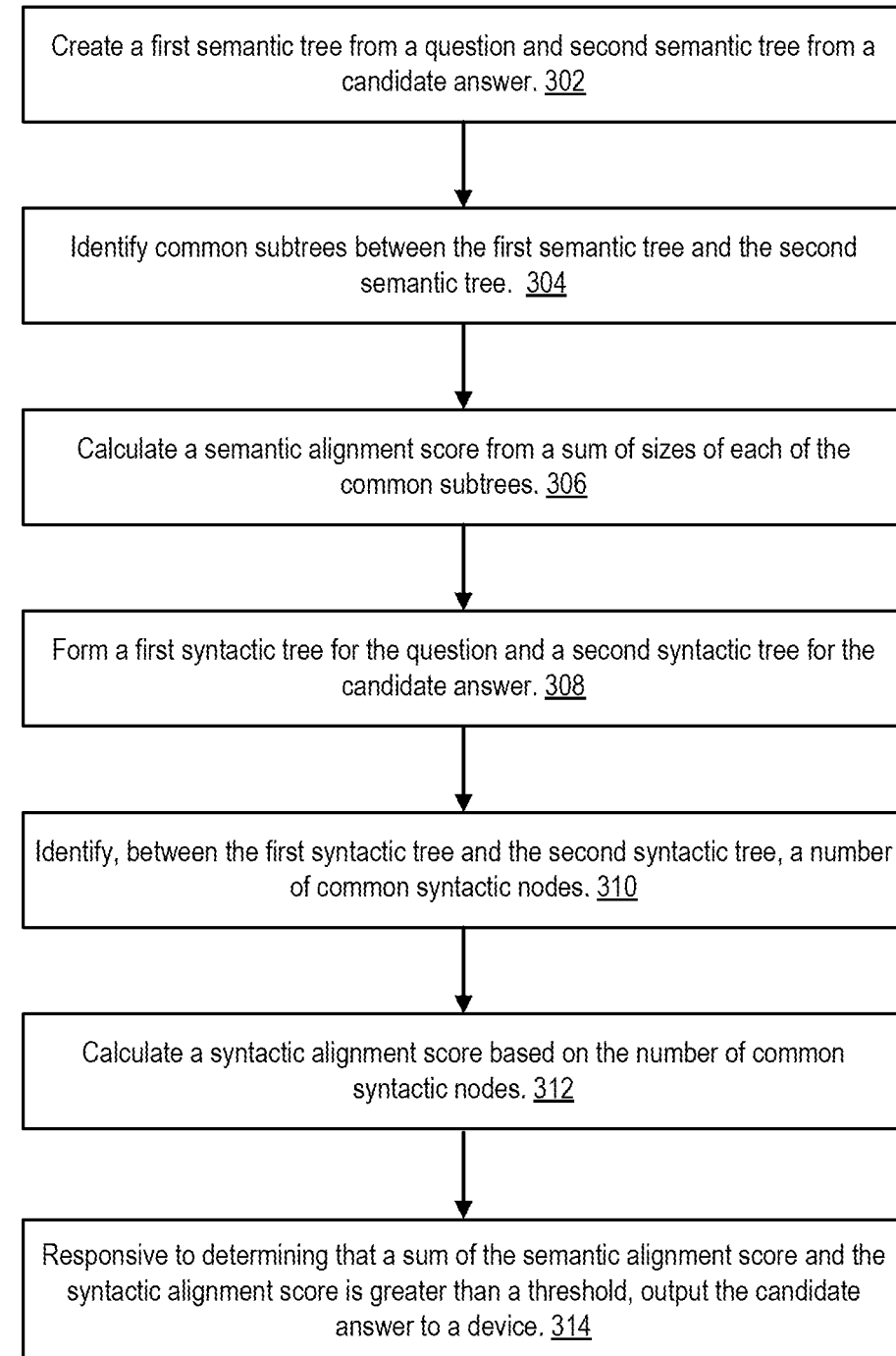
FIG. 3 is a flowchart of an example of a process for validating an answer to a question, in accordance with an aspect.

FIG. 3 is a flowchart of an example of a process 300 for validating an answer to a question, in accordance with an aspect. Autonomous agent 112 can implement process 300 on computing device 110. In some cases, some of the operations in process 300 may not be necessary, and therefore are not performed. It will be appreciated that process 300 can repeat additional times in the event that a candidate answer is not sufficiently appropriate or accurate.

Further, process 300 can iterate multiple times to generate answers for multiple questions. For instance a user can carry on a conversation and with follow-up questions. In each case, semantic and syntactic graphs can be created for each candidate question and then a number of common subtrees for each of multiple candidate questions can be compared with each other or against a threshold.

At operation 302, process 300 involves creating a first semantic tree from a question and second semantic tree from a candidate answer. In some cases, a question is converted into normalized or sentence form prior to the creation of the semantic tree. In an example, the candidate answer can originate from an answer database or can be created via a deep learning system (e.g., via deep learning model 118). A first semantic tree is generated for a question and a second semantic tree is generated for the answer text. A semantic tree refers to a generic representation of semantic information. As discussed below, different semantic representations can be used such as AMR.

A semantic tree (or graph) includes nodes and edges. The nodes represent entities (e.g., a place, person, or thing). Each edge represents a relationship between two of the entities. Information from a semantic tree can alternatively be represented by text. For instance, FIG. 4 is a flattened AMR graph and FIG. 5 depicts an AMR graph.

At operation 304, process 300 involves identifying common subtrees between the first semantic tree and the second semantic tree. One or more common subtrees may be identified between the first semantic tree and the second semantic tree. Different approaches can be used to identify a common subtree, including aligning the first and second semantic trees. For instance, a common subtree includes nodes, each of which represents an entity that is common between the first semantic tree and the second semantic tree and has edges between the nodes that represent a semantic relationship between the entities. The nodes are shared in the first semantic tree and the second semantic tree.

For example, matching a semantic tree for a question to a semantic tree for an answer can be broadly classified into three main steps: (1) locating the topic entity in the question, (2) finding the main relationship between the answer and the topic entity, and (3) expanding the query graph with additional constraints that describe properties the answer needs to have, or relationships between the answer and other entities in the question.

A query graph that can be straightforwardly mapped to a logical form in λ-calculus and is semantically related to k-dependency-based compositional semantics (DCS) is defined. For instance, for an expression 'citizens who live in Boston' regular λ-calculus gives λx. ∃e.PlacesLive(x, e)^Location(e, Boston) and λ-DCS gives PlacesLive.Location.Boston. Hence, DCS attempts to remove explicit use of variables; it makes it similar in spirit to dependency-based compositional semantics.

Matching a semantic parse tree for a question against that for an answer is formulated as query graph generation as state transitions from a seed alignment towards a full alignment. Each state is a candidate mapping between parses such as AMR(Q)→AMR(A) in the query graph representation and each action defines a way to grow the alignment. The representation power of the alignment of a pair of semantic parses is thus controlled by the set of allowed alignment actions applicable to each state.

When aligning an AMR(V,E) against syntactic dependency parse tree T(U,F) or another AMR graph, the costs of aligning each node v in AMR with each node n in T are computed. The cost of aligning two nodes takes into account the graphlet degree signature similarity between them, modified to reduce the cost as the degrees of both nodes increase, because higher degree nodes with similar signatures provide a tighter constraint than correspondingly similar low degree nodes. In this way, we align the densest parts of the AMR graph first.

Graphlets are defined as small connected non-isomorphic induced subgraphs of a large graph such as AMR graph. Graphlet degree vectors (signatures) and signature similarities are introduced to support graph alignment procedure. This measure generalizes the degree of a node, which counts the number of edges that the node touches, into the vector of graphlet degrees, or graphlet degree signature, counting the number of graphlets that the node touches at a particular orbit, for all graphlets on 2 to 5 nodes. The resulting vector of seventy-three coordinates is the signature of a node that describes the topology of a node's neighborhood and captures its interconnectivities out to a distance of 4. The graphlet degree signature of a node provides a highly constraining measure of local topology in its vicinity and comparing the signatures of two nodes provides a highly constraining measure of local topological similarity between them.

The signature similarity is computed as follows. For a node u in graph G, $u_i$ denotes the $i^{th}$ coordinate of its signature vector, i.e., $u_i$ is the number of times node u is touched by an orbit i in G. The distance $D_i(u,v)$ between the $i^{th}$ orbits of nodes u and v is defined as:

$$D_i(u, v) = \omega_i \times \frac{|\log(D_i + 1) - \log(v_i + 1)|}{\log(\max(\{u_i, v_i\} + 2)}$$

where $w_i$ is the weight of orbit i that accounts for dependencies between orbits. The total distance D(u,v) between nodes u and v is defined as:

$$D(u, v) = \frac{\sum_{i=0}^{72} D_i}{\sum_{i=0}^{72} \omega_i}$$

The distance D(u,v) is in [0, 1), where distance 0 means that signatures of nodes u and v are identical. Finally, the signature similarity, S(u,v), between nodes u and v is:

$$S(u,v)=1-D(u,v)$$

Clearly, a higher signature similarity between two nodes corresponds to a higher topological similarity between their extended neighborhoods up to the distance of four. Number four corresponds to a typical maximum number of arguments of a verb node of an AMR graph.

Let deg(v) be the degree of a node v in AMR, let $\max_{deg(AMR)}$ be the maximum degree of nodes in AMR, and let S(v, u) be the graphlet degree signature similarity of nodes v and u, and let a be a parameter in [0, 1] that controls the contribution of the node signature similarity to the cost function (that is, $1-\alpha$ is the parameter that controls the contribution of node degrees to the cost function), then the cost of aligning nodes v and u is computed as:

$$C(v, u) = 2 - \left((1-\alpha) \times \frac{deg(v) + deg(u)}{\max\_deg(G) + \max\_deg(H)} + \alpha \times S(v, u)\right)$$

A cost of 0 corresponds to a pair of topologically identical nodes v and u, while a cost close to 2 corresponds to a pair of topologically different nodes.

The graph alignment algorithm chooses as the initial seed a pair of nodes v and u from AMR and T which have the smallest cost. Ties are broken randomly. Once the seed is found, we build the spheres of all possible radii around nodes v and u. A sphere of radius r around node v is the set of nodes $S_{AMR}(v, r) = \{x \in AMR: d(v, x) = r\}$ that are at distance r from v, where the distance d(v, x) is the length of the shortest path from v to x. Spheres of the same radius in two networks are then greedily aligned together by searching for the pairs (v', u'): $v' \in S_{AMR}(v, r)$ and $u' \in S_T(u, r)$ that are not already aligned and that can be aligned with the minimal cost.

When all spheres around the initial seed (v, u) have been aligned, other nodes in both AMR and T are still unaligned. The same algorithm is repeated on a pair of graphs ($AMR^p$, $T^p$) for p=1.3 and attempt to identify a new seed again, if necessary. The graph $AMR^p$ is defined as a new graph $AMR^p = (V, E^p)$ having the same set of nodes as AMR and having $(v,x) \in E^p$ if and only if the distance between nodes v and x in AMR is less than or equal to p. In other words $d_{AMR}(v, x) \leq p$. $AMR^1 = AMR$. Using $AMR^p$ (p>1) aligns a path of length p in one graph to a single edge in another graph, which is analogous to allowing "insertions" or "deletions" in a sequence alignment. The alignment procedure is stopped when each node from AMR is aligned to exactly one node in T.

Such a feature of AMR parsing as abstraction is associated between alignment between words and their semantic representations (not a graph alignment). This feature is related to how concepts are extracted from AMR and build mappings between word's surface form and its semantic meaning. (Wang 2018) proposes to tackle it with a novel graph-based aligner designed specifically for word-to-concept scenario and show that better alignment results could improve AMR parsing results. Building the alignment between word and AMR concept is often conducted as a preprocessing step. As a result, accurate concept identification crucially depends on the word-to AMR-concept alignment. Because there is no manual alignment in AMR annotation, typically either a rule-based or unsupervised aligner is applied to the training data to extract the mapping between words and concepts. This mapping will then be used as reference data to train concept identification models. A JAMR aligner greedily aligns a span of words to graph fragment using a set of heuristic rules. While it can easily incorporate information from additional linguistic sources such as WordNet, it is not adaptable to other domains. Unsupervised aligners borrow techniques from Machine Translation and treat sentence-to-AMR alignment as a word alignment problem between a source sentence and its linearized AMR graph. Alignment is further illustrated in FIG. 6.

At operation 306, process 300 involves calculating a semantic alignment score from a sum of sizes of each of the common subtrees. The semantic alignment score represents a sum of the sizes of the common subtree. A size of a common subtree equals a number of nodes in the common subtree. For instance, if a first subtree has four nodes and a second subtree has six nodes, and there are two subtrees, then the semantic alignment score is ten. A largest common subtree can be a maximal common subtree. A maximal common subtree indicates a best alignment between the semantic trees and is created from a collection of trees $T_1 \ldots T_m$ each containing n leaves. The leaves of these trees are given labels from a set L where |L|=n so that no pair of leaves in the same tree share the same label. Within the same tree the labelling for each leaf is distinct. A maximal common subtree is a largest subset $L' \subset L$ such that the minimal spanning subtrees containing the leaves in L' of $T_1|S, \ldots T_m|S$ are the same while preserving the labelling.

Figure 7:
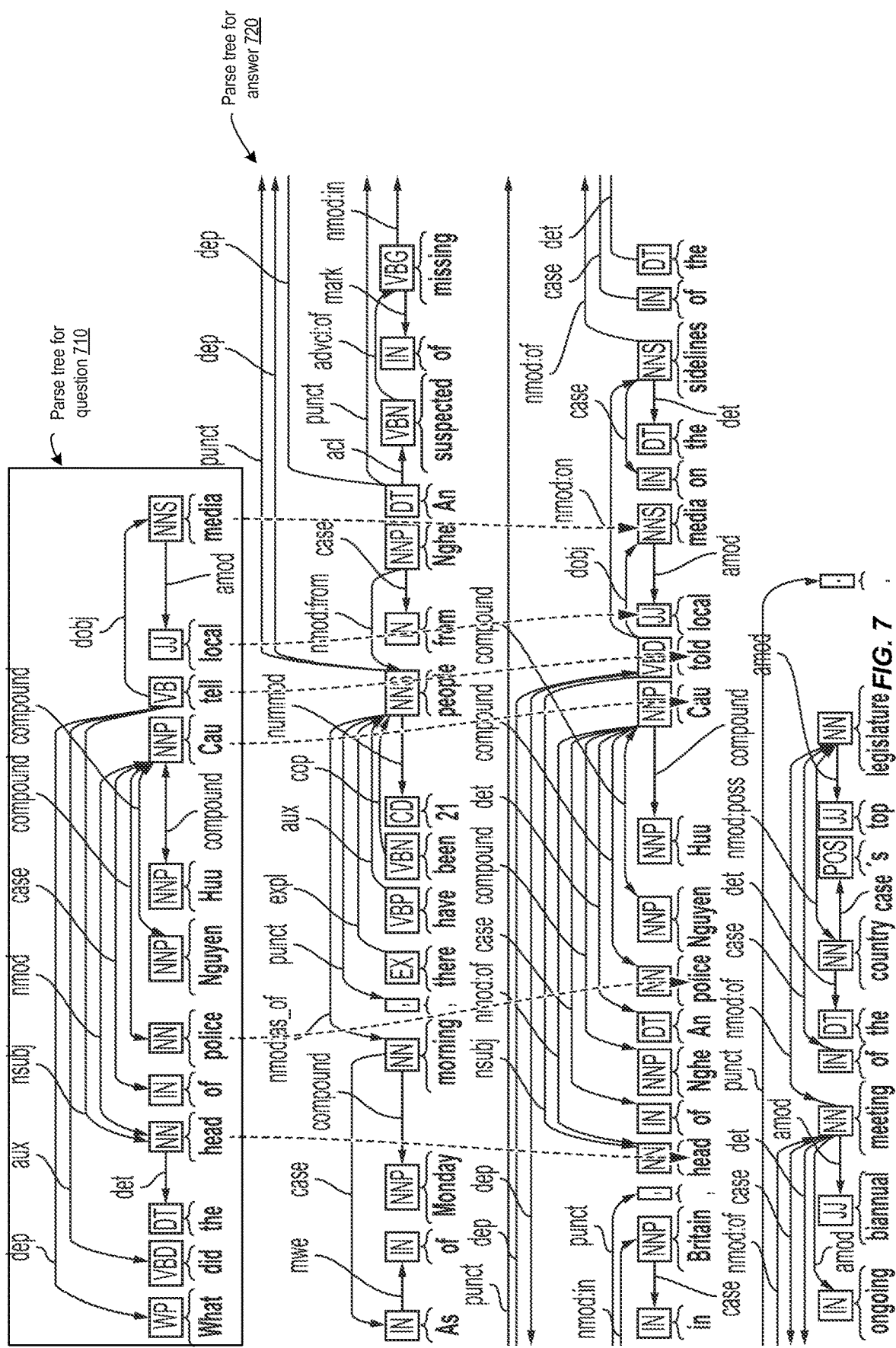
FIG. 7 depicts examples of syntactic parse trees for a question and an answer, in accordance with an aspect.

At operation 308, process 300 involves forming a first syntactic tree for the question and a second syntactic tree for the candidate answer. Each syntactic tree includes syntactic nodes that represent a word and an associated part of speech. FIG. 7 depicts examples of mappings between a syntactic tree for a question and a syntactic tree for an answer. As discussed with respect to FIG. 7, various mappings are shown between the semantic trees.

At operation 310, process 300 involves identifying, between the first syntactic tree and the second syntactic tree, a number of common syntactic nodes. Different approaches can be used. For instance, a machine-learning based approach can identify common nodes. In this case, the syntactic trees are provided to a trained machine-learning model, which identifies and outputs the common syntactic nodes. The common syntactic nodes are connected between the first and second syntactic trees.

In other cases, an algorithmic approach can be used such as syntactic generalization. In an example, the first syntactic tree and second syntactic tree can be merged into a common tree. Within the common tree, a noun or an entity common to both syntactic trees is identified.

To measure of similarity of abstract entities expressed by logic formulas, a least-general generalization is proposed for a number of machine learning approaches, including explanation based learning and inductive logic programming. Least general generalization was originally introduced by (Plotkin 1970). It is the opposite of most general unification (Robinson 1965) therefore it is also called anti-unification. For two words of the same part of speech (POS), their generalization is the same word with the POS. If the lemmas for the two words are different, but the POS is the same, then the POS remains in the result. If lemmas are the same, but POS is different, lemma stays in the result. A lemma represents a word without the related part-of-speech information.

To illustrate this concept, consider an example of two natural language expressions. The meanings of the expressions are represented by logic formulas. The unification and anti-unification of these formulas are constructed. Some words (entities) are mapped to predicates, some are mapped into their arguments, and some other words do not explicitly occur in logic form representation, but indicate the above instantiation of predicates with arguments.

Consider the following two sentences "camera with digital zoom" and "camera with zoom for beginners." To express the meanings, the following logic predicates are used:
camera(name_of_feature, type_of_users) and
zoom(type_of_zoom).

Note that this is a simplified example, and as such, may have a reduced number of arguments as compared to more typical examples. Continuing the example, the above expressions can be represented as:
camera(zoom(digital), AnyUser), and
camera(zoom(AnyZoom), beginner)

According to the notation, variables (non-instantiated values, not specified in NL expressions) are capitalized. Given the above pair of formulas, unification computes their most general specialization camera(zoom(digital), beginner), and anti-unification computes their most specific generalization, camera(zoom(AnyZoom), AnyUser).

At the syntactic level, the expressions are subjected to a generalization ('^') of two noun phrases as: {NN-camera, PRP-with, [digital], NN-zoom [for beginners]}. The expressions in square brackets are eliminated because they occur in one expression, but do not occur in the other. As a result, obtain{NN-camera, PRP-with, NN-zoom]}, which is a syntactic analog of semantic generalization, is obtained.

The purpose of an abstract generalization is to find commonality between portions of text at various semantic levels. Generalization operation occurs on the one or more levels. Examples of levels are paragraph level, sentence level, phrase level, and word level.

At each level (except word-level), individual words, the result of generalization of two expressions is a set of expressions. In such set, for each pair of expressions, so that one is less general than other, the latter is eliminated. Generalization of two sets of expressions is a set of sets which are the results of pair-wise generalization of these expressions.

Only a single generalization exists for a pair of words: if words are the same in the same form, the result is a node with this word in this form. To involve word2vec models (Mikolov et al., 2015), compute generalization of two different words, the following rule is used. If subject1=subject2, then subject1^subject2=<subject1, POS (subject1), 1>. Otherwise, if they have the same part-of-speech, subject1^subject2=<*,POS(subject1), word2vecDistance(subject1^subject2)>. If part-of-speech is different, generalization is an empty tuple. It cannot be further generalized.

For a pair of phrases, generalization includes all maximum ordered sets of generalization nodes for words in phrases so that the order of words is retained. In the following example, "To buy digital camera today, on Monday."

"Digital camera was a good buy today, first Monday of the month."

Figure 8:
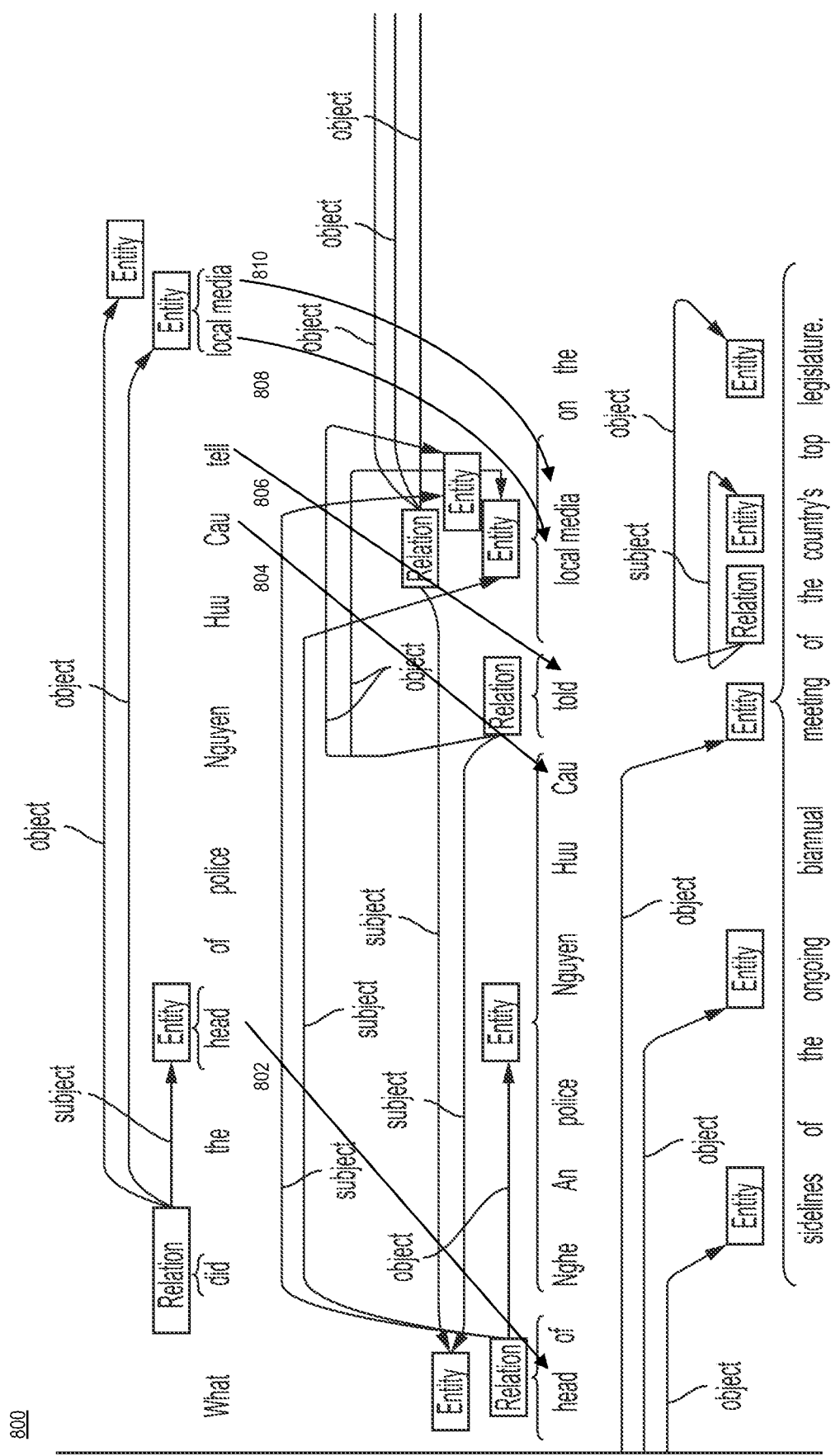
FIG. 8 depicts an example of a mapping between entities of a question and an answer, in accordance with an aspect.

Generalization is {<JJ-digital, NN-camera>, <NN-today, ADV,Monday>}, where the generalization for noun phrases is followed by the generalization for an adverbial phrase. Verb buy is excluded from both generalizations because it occurs in a different order in the above phrases. Buy—digital—camera is not a generalization phrase because buy occurs in different sequence with the other generalization nodes. Continuing the example, FIG. 8 illustrates common entities from FIG. 7.

Returning to FIG. 3, at operation 312, process 300 involves calculating a syntactic alignment score based on the number of common syntactic nodes. In general, a greater number of alignments means a greater similarity and therefore a higher score. An ideal answer is when an answer and question are similar (e.g. common words organized in the same manner). In this respect, aligning the structure of the trees is an improvement over simply identifying common keywords between question and answer.

At operation 314, process 300 involves, responsive to determining that a sum of the semantic alignment score and the syntactic alignment score is greater than a threshold, outputting the candidate answer to a device. A threshold can be used if there is only one candidate answer. But if there is more than one candidate answer, then the semantic and syntactic alignment scores for the different candidate answers can be compared.

FIG. 4 depicts an example of a semantic representation of an answer text, in accordance with an aspect. Semantic representation 400 represents the following text: "As of Monday morning, there have been 21 people from Nghe An suspected of missing in Britain, head of Nghe An police Nguyen Huu Cau told local media on the sidelines of the ongoing biannual meeting of the country's top legislature." As can be seen in semantic representation 400, entity "Nguyen Huu Cau" has been linked to a Wikipedia entry "Nguyen_Huu_Cau" and "Britain" to a Wikipedia entry "United_Kingdom."

Semantic representation 400 is an AMR graph. AMR graphs are intended to abstract away the syntactic representations. For instance, sentences which are similar in meaning are assigned the same AMR representation (even if the sentences are not identically worded). AMR representations are generally intended to work only with the English language. An AMR graph is constructed by identifying sentences or fragments of sentences with known meanings and then substituting the known meaning into the graph. FIG. 5 represents similar information as displayed in FIG. 4.

FIG. 5 depicts an annotated abstract meaning representation graph for a question and an answer and a mapping between question and answer, in accordance with an aspect. FIG. 5 depicts question graph 510 and answer graph 520, which can be built by autonomous agent 112. Question graph 510 and answer graph 520 are AMR graphs.

Once constructed, an AMR graph can be used to obtain semantic information. FIG. 5 is so annotated. More specifically, question graph 510 represents text of the query "Nguyen Huu Cau police interrogative media." Answer graph 520 represents the text "As of Monday morning, there have been 21 people from Nghe An suspected of missing in Britain, head of Nghe An police Nguyen Huu Cau told local media on the sidelines of the ongoing biannual meeting of the country's top legislature."

Autonomous agent 112 generates correspondences between entities in the question graph 510 and answer graph 520. As depicted in FIG. 5, correspondence 502 connects a person (Huu Cau Nguyen) in question graph 510 with the corresponding entity in answer graph 512. Correspondence 504 connects entity "tell-01" in question graph 510 with an entity "tell-01" in answer graph 512.

Additional correspondences (not shown) can be generated. For instance "head-01" in question graph 510 can be linked to "head-01" in the answer graph 520. "Police" in question graph 510 can be linked to "police" in answer graph 520.

Navigating AMR trees can be useful for in various different scenarios. For instance, as described below, questions can give examples of how to navigate AMR trees. Sample questions that correspond to AMR graph traversals are presented below. Notably, deep learning systems fail to correctly generate many of these questions. For instance, a wh-question is formed as such: <What happened> on Monday morning
(1) identify path 'Monday—morning'
(2) traverse up to the node whose argument is 'Monday—morning': <person>
(3) Get the full verb phrase from the node In this case person node is an argument of both head and suspect which is an incorrect semantic parsing. Syntactically, person (->people) is related to suspect and not head so the graph is navigated upwards to suspect, which returns the whole verb phrase for suspect in the answer: suspected of missing in Britain.

Another wh-question is formed as such: <When/Where/How many> were the suspect report missing
(1) Identify the path for the expression 'suspect report missing' as suspect-miss.
(2) Traverse down from suspect through all branches till we hit edge label time/location/quint
(3) Return the value from the target node of this edge Notice the difference between the location of the event being described (in Britain) and the location of agents being described (in Vietnam). DL approach cannot figure out this difference.

Another wh-question is formed as such: <Who> <told/informed/shared information> that the suspects were missing
(1) Identify path 'suspects were missing': suspects-miss
(2) Traverse up or down till we hit the next level predicate: tell
(3) Traverse down till we hit the edge with label person:
(4) Return the value from the target node of this edge Another wh-question is formed as such: <Who is/are/were>/<Tell me/provide information about> missing suspects
(1) Identify path 'missing suspects': suspects-miss
(2) Go to other nodes connected to this graph path from upwards or at the same level
(3) Get all values from these nodes and return all these values as a unordered set Another wh-question is formed as such: <Where/From where/Which place>21 missing people <live/come/travel>
(1) Identify path '21 missing people': suspects-miss
(2) Identify the top level node connected with this path
(3) Traverse down for the edge labeled location, return its value Another wh-question is formed as such: <How> did local media learn about missing people
(1) Extract a mental action from query: learn
(2) Split the query with identified mental actions into two parts/phrases
(3) Identify paths for phrases in the query: local-media, missing-person
(4) Identify a verb in the sentence logically associated with the extracted mental action:

Another wh-question is formed as such <If> A tells B about F then B learns F: tell Return all arguments of tell other than those in the query.

Another wh-question is formed as such: <What> did head of police Nguyen Huu Cau tell/say/inform/shared with/let know to local media
<At what> organization/venue/place did the head of police Nguyen Huu Cau tell to local media
(1) Extract a mental action from query: tell
(2) Split the query with identified mental actions into two parts/phrases
(3) Identify paths for phrases in the query: head-of-police-Nguyen-Huu-Cau, local-media
(4) Return all argument of tell other than those in the query.

Additional questions include "<How> often/frequent/regular is meeting of the country's top legislature organized/held," "what was the agenda of the country's top legislature meeting?, "what official/officer/who shared information on the country's top legislature meeting?," "when police officer spoke on the country's top legislature meeting?," and "when did police officer report at country's top legislature meeting?"

Figure 6:
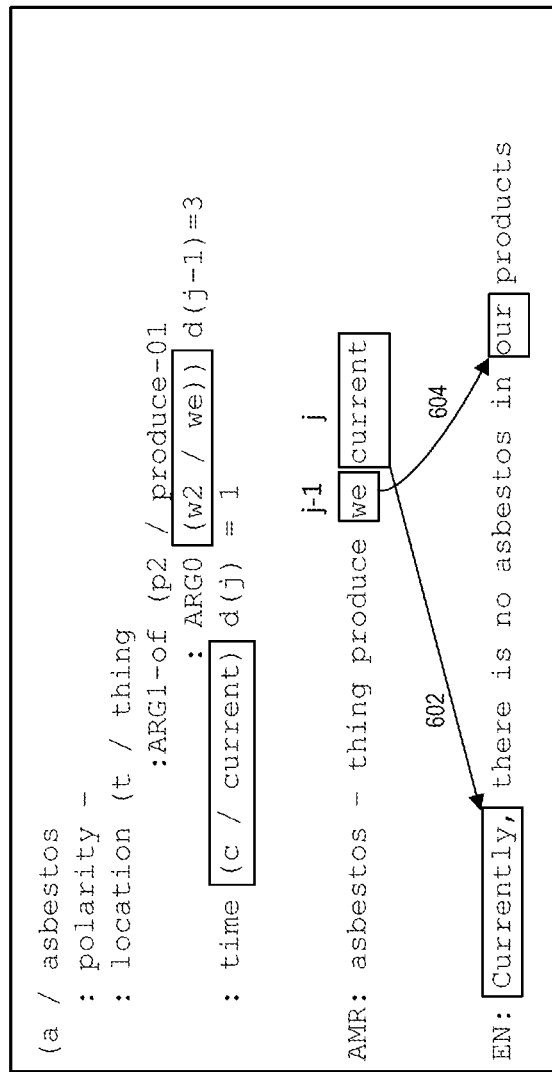
FIG. 6 depicts an example of alignment between a sentence and an abstract meaning representation of a sentence, in accordance with an aspect.

FIG. 6 depicts an example of alignment between a sentence and an abstract meaning representation of a sentence, in accordance with an aspect. FIG. 6 depicts alignment 600, which includes relationships 602 and 604. The concept we in AMR list of tokens is mapped into English word our, and AMR current—into Currently. Hence, the alignment is essentially non-monotonic. FIG. 6 represents a different example of aligning text using AMR. More specifically, FIG. 6 illustrates that it can be more difficult to align when entities are in different order.

FIG. 7 depicts examples of syntactic parse trees for a question and an answer, in accordance with an aspect. FIG. 7 depicts parse tree 710 and parse tree 720. Parse tree 710 is generated from the question "What did the head of police Nguyen Huu Cau tell local media?" Parse tree 720 is generated from the text "As of Monday morning, there have been 21 people from Nghe An suspected of missing in Britain, head of Nghe An police Nguyen Huu Cau told local media on the sidelines of the ongoing biannual meeting of the country's top legislature."

FIG. 8 depicts an example of a mapping between entities of a question and an answer, in accordance with an aspect. FIG. 8 depicts graph 800, which includes relations 802, 804, 806, 808, and 810. As can be seen, relation 802 maps "head" in the question to "head" in the answer, relation 804, "Cau" to "Cau," relation 806 "tell" to "told" (note the difference in verb tense), relation 808 "local" to "local," and 810 "media" to "media."

Correcting Answers Generated by Deep Learning Systems

In an aspect, autonomous agent 112 can use deep learning model 118 to generate text of an answer based on a candidate question. For instance, autonomous agent 112 provides the question into deep learning model 118. Deep learning model 118 is trained to select a body of text corresponding to the question. Autonomous agent 112 obtains the candidate answer from the deep learning model. Autonomous agent 112 can use the techniques described with respect to process 300 to correct answers generated via deep learning (e.g., deep learning model 118).

Deep learning model 118 can be trained by iteratively providing a training question and text comprising context corresponding to the training question to the model and receiving an answer from the model. At each iteration, entities in the answer are compared to entities in a reference answer that corresponds to the training question and one or more parameters of the model of the classification model are adjusted to minimize a loss function.

In some cases, text provided to the deep learning model 118 is translated into vectors before being provided to the model. Each vector can represent words and sentences from the text. The set of vectors are provided to the model and the answer is obtained. A word2vec model can be utilized.

An example of correcting an answer obtained from deep learning follows. The following example text generated by a deep learning model can be corrected: "Beyonce Giselle Knowles-Carter (born Sep. 4, 1981) is an American singer, songwriter, record producer, and actress. Born and raised in Houston, Tex., she performed in various singing and dancing competitions as a child, rose to fame in the late 1990s as lead singer of R&B girl group Destiny's Child. Managed by her father, Matthew Knowles, the group became one of the world's best-selling girl groups of all time. Their hiatus saw the release of Beyonce's debut album, Dangerously in Love (2003), which established her as a solo artist worldwide, earned five Grammy Awards and featured the Billboard Hot 100 number-one singles 'Crazy In Love' and 'Baby Boy.'"

Consider the following question "What happened with Beyonce after 1990?" The text of the question is substituted into an identified answer using the Wh-expression (see, e.g., FIG. 5 and accompanying text."

Question (Q)+Answer (A)='Their hiatus saw the release of Beyonce's debut album, Dangerously in Love'<+'with Beyonce after 1990'+>. In Q+A, we show the mandatory part in <+ . . . +> (since it is specified in the Q), preceded by the optional part, identified answer. Now if we generalize (Q+A) with each sentence of context, (Q+A)^context1, (Q+A)^context2, . . . then the mandatory part will not be retained in each generalization result, which indicates that the answer is incorrect. (After 1990)^1990s=1990s Hence generalization of this incorrect answer does not retain the 'after 1990' part. At the same time, generalization of this query with 'rose to fame in the late 1990s' retains all constraint keywords from the question, hence this answer is a correct one.

Evaluation

The alignment algorithm disclosed herein is applied for combining various representations of the same text, as well as for matching two different texts such a question and an answer. A number of architectures of a Q/A system are explored. A scenario is selected in which the proposed graph-based algorithm detects and rectifies errors of traditional neural MRC methods. When the state-of the art neural MRC is applied and delivers a correct answer in almost 90% of cases, the proposed AMR and graph alignment based framework verifies each answer and if it is determined to be incorrect, attempts to find a correct one. This error-correction scenario boosts the state-of-the-art performance by at least 3%.

The AMR-based Reading Comprehension system is evaluated in the following settings:
A stand-alone Q/A
Error correction Q/A of DL, where each question is handled by DL and then AMR attempts to verify/correct it
Hybrid approach where both DL and AMR produces answers and a meta-agent then decides on which answer to choose.

Also, we evaluated the search of the same queries through the totality of documents. Not only a position within a document, but a relevant document itself needs to be found. The purpose of this evaluation is to compare the developed question answering technique with a search engine. In addition to search F1 measure, we use normalized Discounted Cumulative Gain (NDCG, Wang et al 2013), measure for top five search results (Table 3). Full corpus search is implemented integrating MRC component with a TF*IDF search which finds candidate documents which are consequently subject to MRC.

Stanford Question Answering Dataset (SQuAD, Rajpurkar et al 2018) is a reading comprehension dataset, consisting of questions posed by crowd-workers on a set of Wikipedia articles, where the answer to every question is a segment of text, or span, from the corresponding reading passage. With 100,000+question-answer pairs on 500+articles, SQuAD is significantly larger than previous reading comprehension datasets. SQuAD was built by having humans write questions for a given Wikipedia passage and choose the answer span. Other datasets used similar techniques; the NewsQA dataset also consists of 100,000 question-answer pairs from CNN news articles. For other datasets like WikiQA the span is the entire sentence containing the answer (Yang et al., 2015); the task of choosing a sentence rather than a smaller answer span is sometimes called the sentence selection task.

The NarrativeQA (Kocisky et al., 2018) dataset, for example, has questions based on entire long documents like books or movie scripts, while the Question Answering in Context (QuAC) dataset (Choi et al., 2018) has 100K questions created by two crowd workers who are asking and answering questions about a hidden Wikipedia text.

TABLE 1

Performance of the stand-alone AMR system

|  | SQuAD 1.1 | | | SQuAD 2.0 | | |
| --- | --- | --- | --- | --- | --- | --- |
|  | P | R | F1 | P | R | F1 |
| Only syntactic parse trees | 71.6 | 72.9 | 72.24 | 67.2 | 68.3 | 67.75 |
| Only AMR graphs | 75.4 | 78.3 | 76.82 | 74.2 | 73.5 | 73.85 |
| Word2vec is disabled | 83.0 | 78.7 | 80.79 | 78.8 | 75.8 | 77.27 |
| Aligned syntactic trees and | 85.3 | 86.3 | 85.80 | 83.4 | 84.1 | 83.75 |
| ALBERT (Lan et al 2019) |  |  |  |  |  | 92.2 |

Performance of a stand-alone AMR MRC system is shown in Table 1. As we switch from syntactic to semantic level, we gain 5-6% in accuracy. Joint syntactic & semantic systems yields 3-4% improvement, and enabling word2vec into the hybrid aligned syntactic-semantic graph boosts performance by further 5%, still 8% below the DL state-of-the art (the bottom row).

TABLE 2

Performance of a hybrid DL + AMR system on SQuAD 2.0

|  | P | R | F1 |
| --- | --- | --- | --- |
| Stand alone AMR | 83.3 | 84.1 | 83.70 |
| Stand-alone end-to-end DL | 88.2 | 87.4 | 87.80 |
| DL + AMR correcting DL's errors | 92.7 | 92.3 | 92.50 |
| DL versus AMR as selected by meta-agent | 83.1 | 85.0 | 84.04 |
| AMR Errors identification AMR Errors correction | 84.7 | 83.9 |  |

As can be seen in Table 2, the preferred Q/A setting is an answering by DL first and error correction as the second step. This optimal setting is 8% above the stand-alone AMR and a hybrid DL vs AMR with a rule-based answer selection based on DL's and AMR's confidence values. Two rows on the bottom provide further details on the optimal hybrid system. The false-positive rate of AMR component is noticeable, so some correct answers are classified as incorrect and then a wrong answer is delivered. However, it happens less frequently than the other way around, so overall impact of AMR component is positive and more answers are turned from incorrect to correct, than vice versa. This is due to a totally different nature and sources of information of AMR Q/A in comparison with neural, ML-based Q/A. Notice that AMR parsing is in turn done by a neural mechanism and is itself much noisier than MRC learning. However, because of the alignment with reliable syntactic parse, the resultant AMR representation serves as a reliable source for MRC.

TABLE 3

Full Index search accuracy

|  | P | R | F1 | NDCG @ 5 hits |
|---|---|---|---|---|
| Stand alone AMR | 61.1 | 56.3 |  | 0.331 |
| Stand-alone end-to-end DL | 64.7 | 62.4 |  | 0.358 |
| DL + AMR correcting DL's errors | 66.2 | 63.3 |  | 0.410 |
| DL versus AMR as selected by meta-agent | 63.0 | 65.4 |  | 0.342 |

From Table 3, it can be seen that for a search relying on DL and AMR, error correction scenario is beneficial in comparison to a hybrid or stand-alone systems. This is reflected in both F1 measure of the first search result and also NDCG measure for top five search results. A performance of a TF*IDF component that finds the candidate documents does not affect significantly the overall search accuracy.

Both DL and AMR components can be implemented in languages for which word2vec models and semantic annotations are available. An AMR representation for a sentence in English and Chinese is shown below. Each node is also annotated in other languages. Distributional semantic models have been built for major natural languages as well. Hence the proposed technique of MRC enhancement can be applied in a number of languages: this is a subject of our future studies.

::en And there is sweetness in the laughter of all the stars.
::snt 这时，所有的星星都在 柔情地轻声笑着。
(x1/笑 -01 laugh
　　:arg0 (x2/星星 star
　　　　:mod (x3/所有 all))
　　:time (x4/这时 now)
　　:manner (x5/柔情 sweetness)
　　:manner (x6/轻声 soft sound))

The recent surge in NLP model complexity has outstripped Moore's law. (Peters et al., 2018; Devlin et al., 2018; Narasimhan, 2019). Deeply stacked layers of transformers (including BERT, RoBERTa (Liu et al., 2019), XLNet (Yang et al., 2019), and ALBERT (Lan et al. 2019)) have greatly improved state-of-the-art accuracies across a variety of NLP tasks, but the computational intensity has dramatically increased. Some of the main differences between AMR-based Q/A and the deep learning approaches are as follows:

- The path to answers is deterministic so can be fully explained
- A structured data points are returned as an answer, such as a list of values, instead of text fragment
- Questions can be automatically generated for given complexity (entity—single attribute, entity—multiple attributes, multiple entities)
- Question performance can be automatically assessed
- The class of questions answered properly can be circumscribed and the users can acquire intuition on what can be answered and how to formulate questions
- When a DL system answers questions randomly, it is hard for a user to learn how to cooperate better with the system and formulate questions in the way optimal for accurate answering.

Abstract semantic approach allows formulation of an exhaustive set of questions for an entity and its attributes. Also, this approach allows systematic testing and identifying problems with answer selection. AMR-based Q/A is an example of explainable, responsible Q/A well suited for CRM applications.

While SQuAD ranking is not necessarily a reflection of the effectiveness of the real world deployment of the developed Q/A technology, SQuAD is an easier task than the real world problem because one needs to process a lot more content for any practical application in conversational interfaces, which makes the ability to select candidate paragraphs from tens and hundreds of thousands paragraphs useful. An ability to understand structured embedded content like tables is also helpful.

Most traditional approaches for semantic parsing are largely decoupled from the knowledge base, and thus are faced with several challenges when adapted to applications like QA. For instance, a generic meaning representation may have the ontology matching problem when the logical form uses predicates that differ from those defined in the KB (Kwiatkowski et al., 2013). Even when the representation language is related to the knowledge base schema, finding the correct predicates from the large vocabulary in the KB to relations described in the utterance remains a difficult problem (Berant and Liang, 2014). In this chapter we analyzed the support of abstract semantic representation for MRC in a broader setting, with or without a KB.

Note that general-purpose reading comprehension systems are still extractive in nature. They can only answer questions for which the answers are present directly in the content they were trained on. A skill to infer new facts from multiple parts of the content (unavailable via training) and formulate a response to a user query is significantly more difficult. The focused of a MRC deployment is on helping the enterprise to make better decisions and provide better service.

Answering almost all customer questions correctly and concisely is helpful for CRM. The state-of-the-art neural MRC is applied and delivers correct answer in almost 90% of cases. The proposed framework based on AMR and graph alignment verifies each answer attempts to find a proper one, if DL results is classified as incorrect. This error-correction hybrid architecture boosts the state-of-the-art performance by more than 3%. AMR leverages additional abstract-level data accumulated in the course of AMR annotation that is not available for DL-based MRC system, therefore the former nicely complements that latter.

Exemplary Computing Systems

Figure 9:
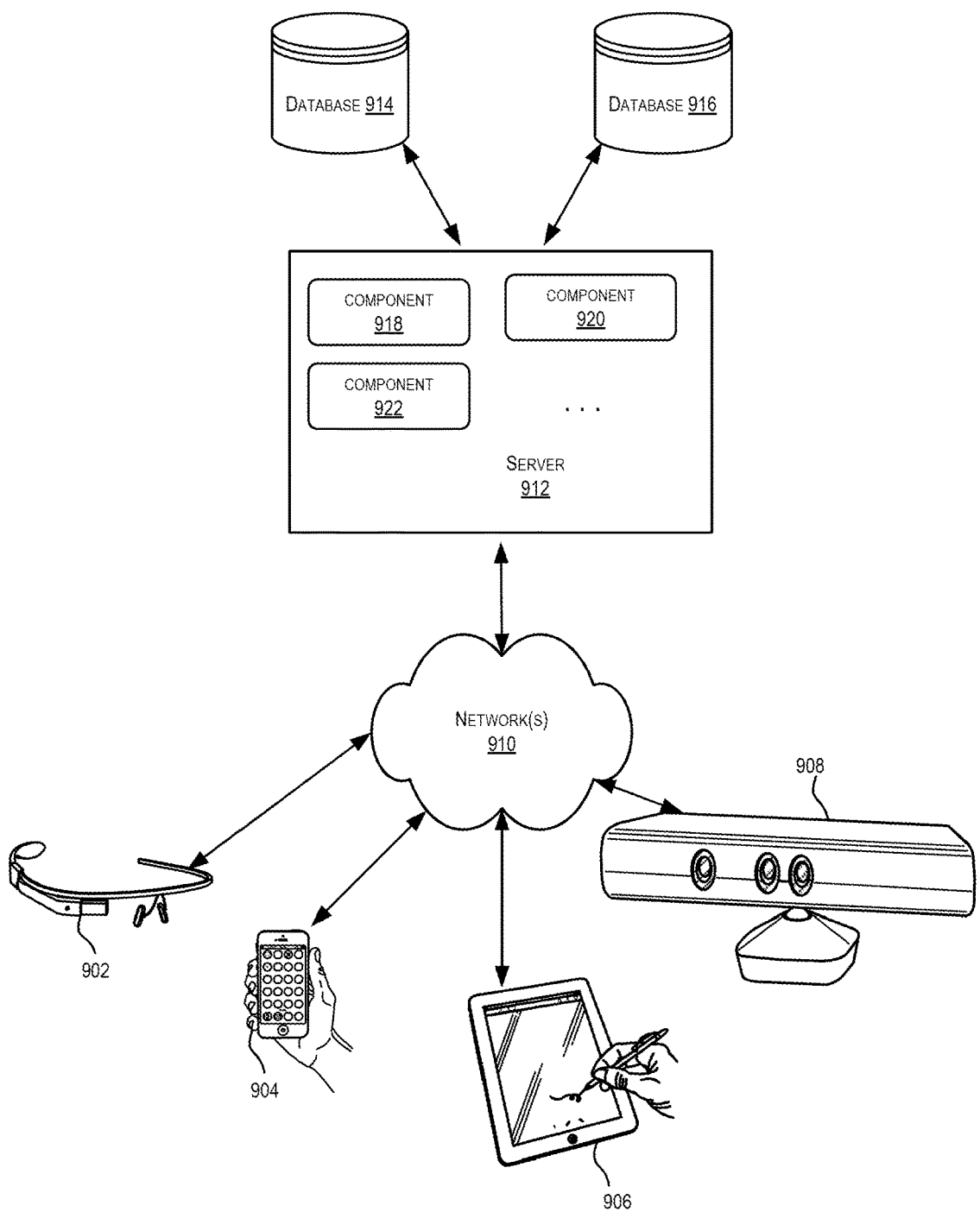
FIG. 9 depicts a simplified diagram of a distributed system for implementing one of the aspects.

FIG. 9 depicts a simplified diagram of a distributed system 900 for implementing one of the aspects. In the illustrated aspect, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various aspects, server 912 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of distributed system 900 are shown as being implemented on server 912. In other aspects, one or more of the components of distributed system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The aspect shown in the figure is thus one example of a distributed system for implementing an aspect system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including, without limitation, the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including, without limitation, a virtual private network (VPN), an intranet, an extranet, a public switched telephone network (PSTN), an infra-red network, a wireless network (e.g., a network operating under any of the Institute of Electrical and Electronics (IEEE) 802.9 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization. One or more flexible pools of logical storage devices can be virtualized to maintain virtual storage devices for the server. Virtual networks can be controlled by server 912 using software defined networking. In various aspects, server 912 may be adapted to run one or more services or software applications described in the foregoing disclosure. For example, server 912 may correspond to a server for performing processing described above according to an aspect of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of aspects, databases 914 and 916 may reside in a storage-area network (SAN). Similarly, any necessary files for performing the functions attributed to server 912 may be stored locally on server 912 and/or remotely, as appropriate. In one set of aspects, databases 914 and 916 may include relational databases, such as databases provided by Oracle, that are adapted to store, update, and retrieve data in response to SQL-formatted commands.

Figure 10:
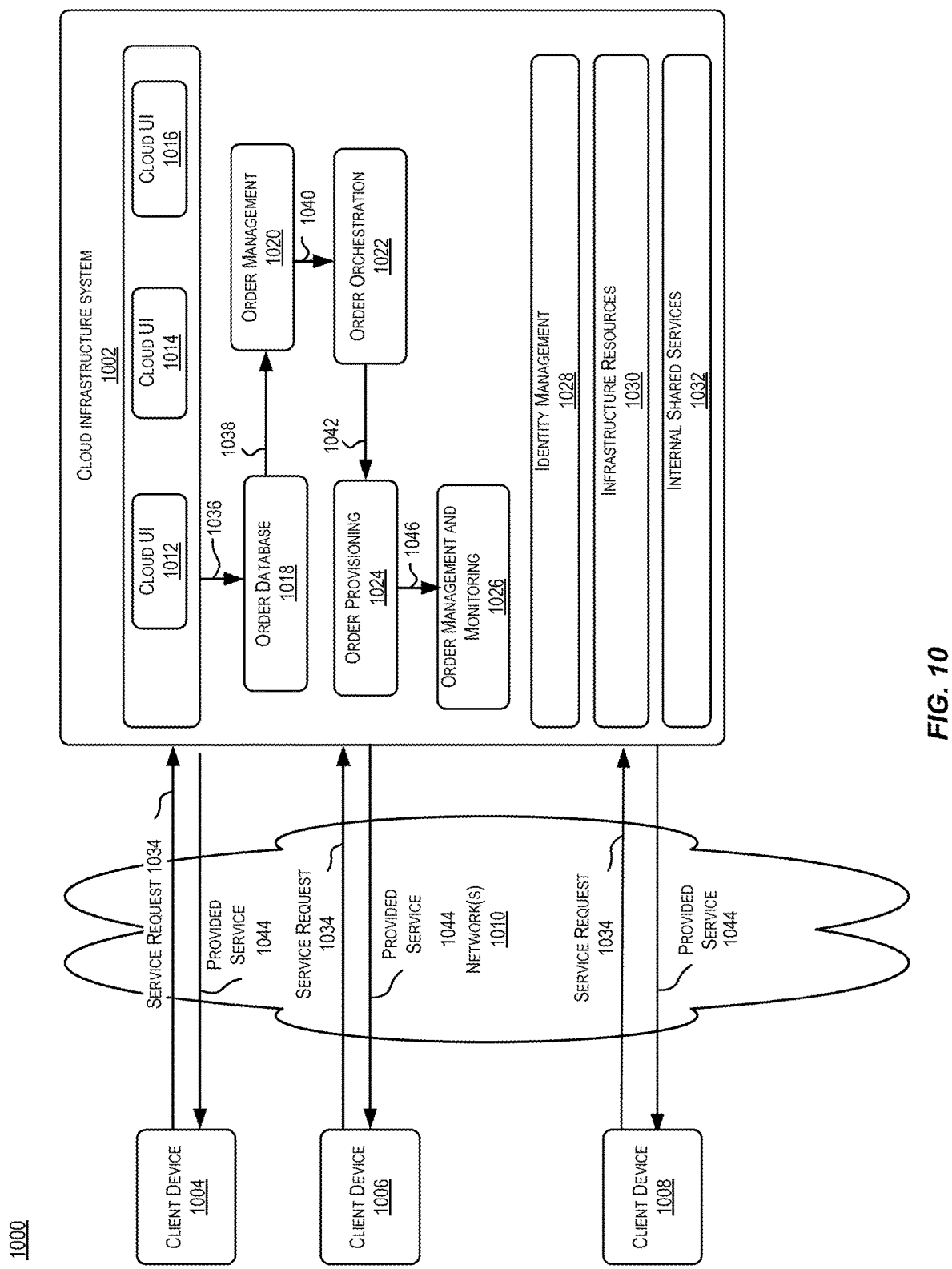
FIG. 10 is a simplified block diagram of one or more components of a system environment by which services provided by one or more components of an aspect system may be offered as cloud services, in accordance with an aspect of the present disclosure.

FIG. 10 is a simplified block diagram of one or more components of a system environment 1000 by which services provided by one or more components of an aspect system may be offered as cloud services, in accordance with an aspect of the present disclosure. In the illustrated aspect, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the aspect shown in the figure is only one example of a cloud infrastructure system that may incorporate an aspect of the invention. In some other aspects, cloud infrastructure system 1002 may have more or fewer components than shown in the figure, may combine two or more components, or may have a different configuration or arrangement of components.

Client computing devices 1004, 1006, and 1008 may be devices similar to those described above for client computing devices 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients computing devices 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some aspects, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some aspects, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1002 may also include infrastructure resources 1030 for providing the resources used to provide various services to customers of the cloud infrastructure system. In one aspect, infrastructure resources 1030 may include pre-integrated and optimized combinations of hardware, such as servers, storage, and networking resources to execute the services provided by the PaaS platform and the SaaS platform.

In some aspects, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1002 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1002, and the like.

In one aspect, as depicted in the figure, cloud management functionality may be provided by one or more modules, such as an order management module 1020, an order orchestration module 1022, an order provisioning module 1011, an order management and monitoring module 1010, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client computing device 1004, 1006 or 1008, may interact with cloud infrastructure system 1002 by requesting one or more services provided by cloud infrastructure system 1002 and placing an order for a subscription for one or more services offered by cloud infrastructure system 1002. In certain aspects, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 in which the customer intends to subscribe.

After an order has been placed by the customer, the order information is received via the cloud UIs, 1010, 1014 and/or 1016.

At operation 1036, the order is stored in order database 1018. Order database 1018 can be one of several databases operated by cloud infrastructure system 1002 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1011.

In certain aspects, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1011 to allocate resources and configure those resources needed to fulfill the subscription order. Order provisioning module 1011 enables the allocation of resources for the services ordered by the customer. Order provisioning module 1011 provides a level of abstraction between the cloud services provided by cloud infrastructure system 1002 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client computing devices 1004, 1006 and/or 1008 by order provisioning module 1011 of cloud infrastructure system 1002.

At operation 1046, the customer's subscription order may be managed and tracked by an order management and monitoring module 1010. In some instances, order management and monitoring module 1010 may be configured to collect usage statistics for the services in the subscription order, such as the amount of storage used, the amount data transferred, the number of users, and the amount of system up time and system down time.

In certain aspects, cloud infrastructure system 1002 may include an identity management module 1028. Identity management module 1028 may be configured to provide identity services, such as access management and authorization services in cloud infrastructure system 1002. In some aspects, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.). Identity management module 1028 may also include the management of descriptive information about each customer and about how and by whom that descriptive information can be accessed and modified.

Figure 11:
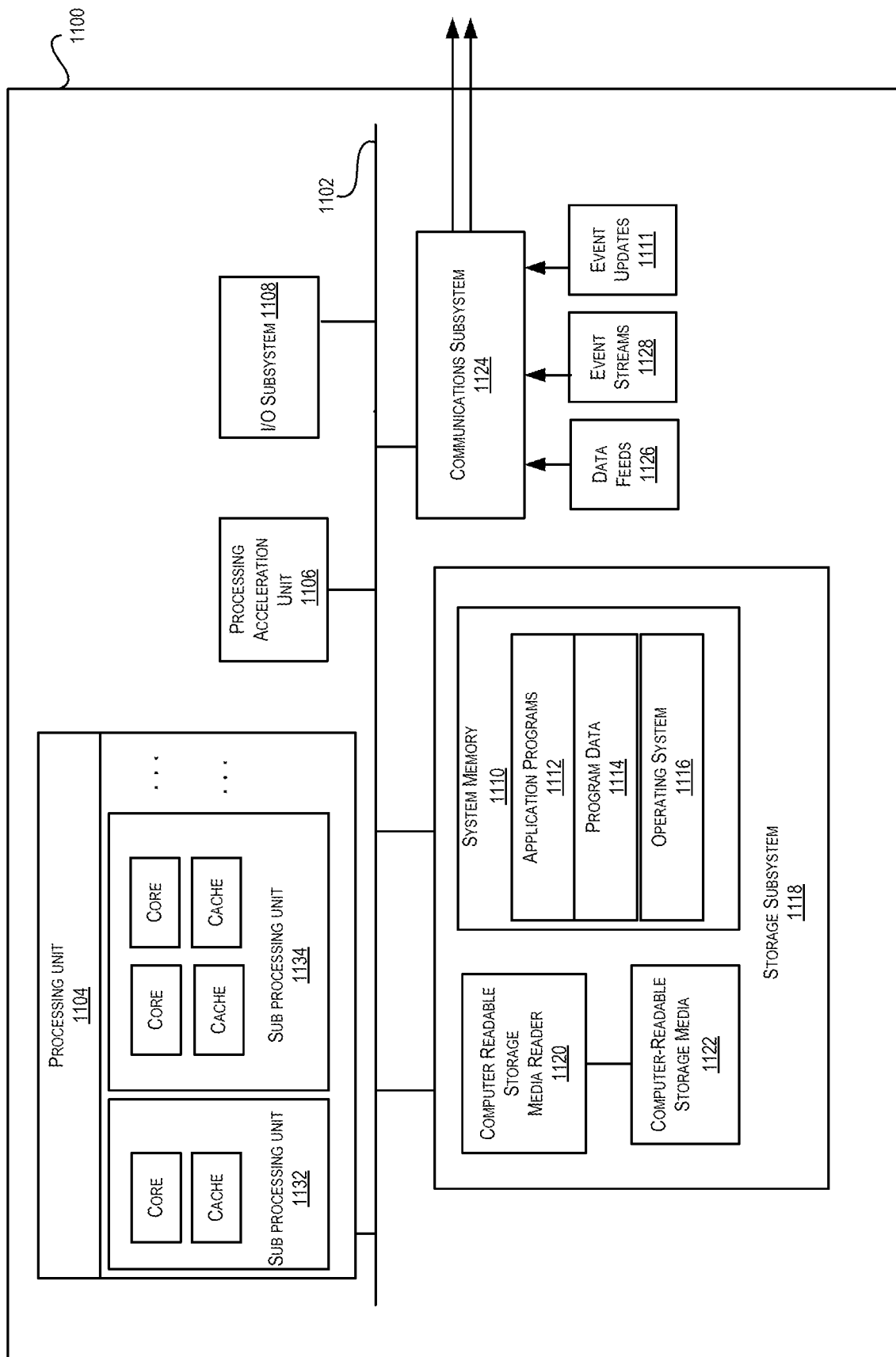
FIG. 11 illustrates an exemplary computing subsystem, in which various aspects may be implemented.

FIG. 11 illustrates an exemplary computing subsystem 1100, in which various aspects may be implemented. The computing subsystem 1100 may be used to implement any of the computing subsystems described above. As shown in the figure, computing subsystem 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1111. Storage subsystem 1118 includes tangible computer-readable storage media 119 and a system memory 1110.

Bus subsystem 1102 provides a mechanism for letting the various components and subsystems of computing subsystem 1100 communicate with each other as intended. Although bus subsystem 1102 is shown schematically as a single bus, alternative aspects of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1186.1 standard.

Processing unit 1104, which can be implemented as one or more integrated circuits (e.g., a conventional microprocessor or microcontroller), controls the operation of computing subsystem 1100. One or more processors may be included in processing unit 1104. These processors may include single-core or multicore processors. In certain aspects, processing unit 1104 may be implemented as one or more independent processing units 1132 and/or 1134 with single or multicore processors included in each processing unit. In other aspects, processing unit 1104 may also be implemented as a quad-core processing unit formed by integrating two dual-core processors into a single chip.

In various aspects, processing unit 1104 can execute a variety of programs in response to program code and can maintain multiple concurrently executing programs or processes. At any given time, some or all of the program code to be executed can be resident in processing unit(s) 1104 and/or in storage subsystem 1118. Through suitable programming, processing unit(s) 1104 can provide various functionalities described above. Computing subsystem 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing subsystem 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computing subsystem 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computing subsystem 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computing subsystem 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/ or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some aspects. Software (programs, code modules, instructions) that when executed by a processor, provides the functionality described above and may be stored in storage subsystem 1118. These software modules or instructions may be executed by processing unit 1104. Storage subsystem 1118 may also provide a repository for storing data used in accordance with the present invention.

Storage subsystem 1118 may also include a computer-readable storage media reader 1120 that can further be connected to computer-readable storage media 119. Together and, optionally, in combination with system memory 1110, computer-readable storage media 119 may comprehensively represent remote, local, fixed, and/or removable storage devices plus storage media for temporarily and/or more permanently containing, storing, transmitting, and retrieving computer-readable information.

Computer-readable storage media 119 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing sub system 1100.

By way of example, computer-readable storage media 119 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 119 may include, but is not limited to, Zip® drives, flash memory cards, universal serial bus (USB) flash drives, secure digital (SD) cards, DVD disks, digital video tape, and the like. Computer-readable storage media 119 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computing subsystem 1100.

Communications subsystem 1111 provides an interface to other computing subsystems and networks. Communications subsystem 1111 serves as an interface for receiving data from and transmitting data to other systems from computing subsystem 1100. For example, communications subsystem 1111 may enable computing subsystem 1100 to connect to one or more devices via the Internet. In some aspects, communications subsystem 1111 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.9 family standards, or other mobile communication technologies, or any combination thereof), global positioning system (GPS) receiver components, and/or other components. In some aspects, communications subsystem 1111 can provide wired network connectivity (e.g., Ethernet) in addition to or instead of a wireless interface.

In some aspects, communications subsystem 1111 may also receive input communication in the form of structured and/or unstructured data feeds 1126, event streams 1128, event updates 1130, and the like on behalf of one or more users who may use computing subsystem 1100.

By way of example, communications subsystem 1111 may be configured to receive unstructured data feeds 1126 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1111 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1111 may also be configured to output the structured and/or unstructured data feeds 1126, event streams 1128, event updates 1130, and the like to one or more databases that may be in communication with one or more streaming data source computers coupled to computing subsystem 1100.

Computing subsystem 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computing subsystem 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of verifying an alignment of text, the method comprising:
   identifying a plurality of common subtrees between a first semantic tree that represents a first text and a second semantic tree that represents a second text, wherein each semantic tree comprises semantic nodes that represent entities and semantic edges that represent relationships between two of the entities, wherein a common subtree comprises (i) nodes, each node representing a common entity that is common between the first semantic tree and the second semantic tree and (ii) edges between the nodes that represent a semantic relationship between the entities;
   calculating a semantic alignment score from a sum of sizes of each of the plurality of common subtrees, wherein a size of a common subtree equals a number of nodes in the common subtree;
   identifying, between a first syntactic tree that represents the first text and a second syntactic tree that represents the second text, a number of common syntactic nodes, wherein each syntactic tree comprises syntactic nodes that represent a word and an associated part of speech;
   calculating a syntactic alignment score based on the number of common syntactic nodes; and
   responsive to determining that a sum of the semantic alignment score and the syntactic alignment score is greater than a threshold, outputting the second text to a device.

2. The method of claim 1, wherein the identifying the number of common syntactic nodes comprises:
   applying a trained classification model to the first syntactic tree and the second syntactic tree; and
   receiving, from the trained classification model, information indicating common syntactic nodes.

3. The method of claim 1, further comprising:
   determining an additional semantic alignment score between the first text and an additional text;
   determining an additional syntactic alignment score between the first text and the additional text; and
   responsive to determining that an additional sum of the additional semantic alignment score and the additional syntactic alignment score is greater than a threshold, outputting the additional text to the device.

4. The method of claim 1, further comprising:
   providing the first text into a classification model, wherein the classification model is trained to select a body of text corresponding to the first text; and
   obtaining the second text from the classification model.

5. The method of claim 4, further comprising training the classification model by iteratively:
   providing, to the classification model, training text and a corresponding reference answer;
   receiving, from the classification model, a generated answer;
   comparing entities in the generated answer to entities in the reference answer; and
   adjusting, based on the comparing, a parameter of the classification model to minimize a loss function.

6. The method of claim 1, further comprising obtaining one or more of the first text or the second text from a body of text.

7. The method of claim 1, further comprising:
translating additional text into a set of vectors, wherein each vector represents words and sentences from the additional text;
providing the set of vectors to a classification model, wherein the classification model is trained to generate answers from the additional text; and
obtaining, from the classification model, the second text.

8. A system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to perform operations comprising:
identifying a plurality of common subtrees between a first semantic tree that represents a first text and a second semantic tree that represents a second text, wherein each semantic tree comprises semantic nodes that represent entities and semantic edges that represent relationships between two of the entities, wherein a common subtree comprises (i) nodes, each node representing a common entity that is common between the first semantic tree and the second semantic tree and (ii) edges between the nodes that represent a semantic relationship between the entities;
calculating a semantic alignment score from a sum of sizes of each of the plurality of common subtrees, wherein a size of a common subtree equals a number of nodes in the common subtree;
identifying, between a first syntactic tree that represents the first text and a second syntactic tree that represents the second text, a number of common syntactic nodes, wherein each syntactic tree comprises syntactic nodes that represent a word and an associated part of speech;
calculating a syntactic alignment score based on the number of common syntactic nodes; and
responsive to determining that a sum of the semantic alignment score and the syntactic alignment score is greater than a threshold, outputting the second text to a device.

9. The system of claim 8, wherein the identifying comprises:
applying a trained classification model to the first syntactic tree and the second syntactic tree; and
obtaining information indicating common syntactic nodes from the classification model.

10. The system of claim 8, wherein executing the computer-executable program instructions configures the processing device to perform operations comprising:
determining an additional semantic alignment score between the first text and an additional text;
determining an additional syntactic alignment score between the first text and the additional text; and
responsive to determining that an additional sum of the additional semantic alignment score and the additional syntactic alignment score is greater than a threshold, outputting the additional text to the device.

11. The system of claim 8, wherein executing the computer-executable program instructions configures the processing device to perform operations comprising:
providing the first text into a classification model, wherein the classification model is trained to select a body of text corresponding to the first text; and
obtaining, from the classification model, the second text.

12. The system of claim 11, wherein executing the computer-executable program instructions configures the processing device to perform operations comprising training the classification model by iteratively:
providing, to the classification model, a training question and text comprising context corresponding to the training question;
receiving, from the classification model, an answer;
comparing entities in answer to entities in a reference answer that corresponds to the training question; and
adjusting, based on the comparing, a parameter of the classification model to minimize a loss function.

13. The system of claim 8, wherein executing the computer-executable program instructions configures the processing device to perform operations comprising:
translating additional text into a set of vectors, wherein each vector represents words and sentences from the additional text;
providing the set of vectors to a classification model, wherein the classification model is trained to generate answers from the additional text; and
obtaining, from the classification model, the second text.

14. A non-transitory computer-readable storage medium storing computer-executable program instructions, wherein when executed by a processing device, the program instructions cause the processing device to perform operations comprising:
accessing a first semantic tree for a first text and second semantic tree for a second text, wherein each semantic tree comprises nodes and edges, wherein the nodes represent entities, and wherein each edge represents a relationship between two of the entities;
identifying, between the first semantic tree and the second semantic tree, a plurality of common subtrees, wherein a common subtree comprises (i) nodes, each node representing a common entity that is common between the first semantic tree and the second semantic tree and (ii) edges between the nodes that represent a semantic relationship between the entities;
calculating a semantic alignment score from a sum of sizes of each of the plurality of common subtrees, wherein a size of a common subtree equals a number of nodes in the common subtree; and
responsive to determining that the semantic alignment score is greater than a threshold, outputting the second text to a device.

15. The non-transitory computer-readable storage medium of claim 14, wherein when executed by a processing device, the program instructions cause the processing device to perform operations comprising:
providing the first text into a classification model, wherein the classification model is trained to select a body of text corresponding to the first text; and
obtaining, from the classification model, the second text.

16. The non-transitory computer-readable storage medium of claim 15, wherein when executed by a processing device, the program instructions cause the processing device to perform operations comprising training the classification model by iteratively:
providing, to the classification model, a training question and text comprising context corresponding to the training question;
receiving, from the classification model, an answer;
comparing entities in answer to entities in a reference answer that corresponds to the training question; and
adjusting, based on the comparing, a parameter of the classification model to minimize a loss function.

17. The non-transitory computer-readable storage medium of claim 14, wherein when executed by a processing device, the program instructions cause the processing device to perform operations comprising:

determining a syntactic alignment score between the first text and an additional text; and responsive to determining that a sum of the semantic alignment score and the syntactic alignment score is greater than a threshold, outputting the additional text to the device.

18. The non-transitory computer-readable storage medium of claim 14, wherein when executed by a processing device, the program instructions cause the processing device to perform operations comprising:

translating additional text into a set of vectors, wherein each vector represents words and sentences from the additional text;

providing the set of vectors to a classification model, wherein the classification model is trained to generate answers from the additional text; and obtaining, from the classification model, the second text.

19. The non-transitory computer-readable storage medium of claim 18, wherein the translating comprises providing the first text and the second text to a word2vec model.

20. The non-transitory computer-readable storage medium of claim 14, wherein the first text represents a question and the second text represents an answer.

\* \* \* \* \*

UNITED STATES PATENT AND TRADEMARK OFFICE
CERTIFICATE OF CORRECTION

PATENT NO. : 11,741,316 B2
APPLICATION NO. : 17/823300
DATED : August 29, 2023
INVENTOR(S) : Galitsky It is certified that error appears in the above-identified patent and that said Letters Patent is hereby corrected as shown below:

In the Specification

In Column 6, Line 6, delete "K-" and insert -- $\lambda$- --, therefor.

In Column 6, Line 8, delete "$\lambda x. \exists e.PlacesLive(x, e)$" and insert -- $\lambda x. \exists e.PlacesLive(x, e)$ --, therefor.

In Column 7, Line 14 (Approx.), delete "a" and insert -- $\alpha$ --, therefor.

In Column 7, Line 42, delete "p=1.3" and insert -- p=1...3 --, therefor.

In Column 7, Line 46, delete "top." and insert -- to p. --, therefor.

In Column 7, Line 47, delete "AMRl" and insert -- AMR1 --, therefor.

In Column 9, Line 18 (Approx.), delete "beginner)" and insert -- beginner). --, therefor.

In Column 13, Line 23, delete ""text."" and insert -- text. --, therefor.

In Column 15, Line 46, delete "sound))" and insert -- sound)). --, therefor.

In Column 26, Line 37, delete "sub system" and insert -- subsystem --, therefor.

In Column 27, Lines 5-6, delete "evolu-tion)," and insert -- evolu-tion)), --, therefor.

Signed and Sealed this
Fifteenth Day of April, 2025

Coke Morgan Stewart
*Acting Director of the United States Patent and Trademark Office*